(12) United States Patent
Kimura et al.

(10) Patent No.: US 7,249,110 B1
(45) Date of Patent: Jul. 24, 2007

(54) INDIVIDUAL AUTHENTICATION METHOD, INDIVIDUAL AUTHENTICATION APPARATUS, ACCOUNTING METHOD, ACCOUNTING APPARATUS

(75) Inventors: Yasunari Kimura, Yokohama (JP); Ken Ikeda, Machida (JP)

(73) Assignee: Matsushita Electric Industrial Co, Ltd., Osaka (JP)

( * ) Notice: Subject to any disclaimer, the term of this patent is extended or adjusted under 35 U.S.C. 154(b) by 88 days.

(21) Appl. No.: 09/631,301

(22) Filed: Aug. 2, 2000

(30) Foreign Application Priority Data

Aug. 3, 1999 (JP) .................................. 11-219739

(51) Int. Cl.
G06Q 99/00 (2006.01)
H04K 1/00 (2006.01)
G06F 17/00 (2006.01)
G06F 9/00 (2006.01)
H04Q 7/20 (2006.01)

(52) U.S. Cl. .................. 705/67; 705/408; 705/75; 455/436; 455/463; 726/14

(58) Field of Classification Search .............. 705/67, 705/1, 75, 408; 235/380; 379/91.01; 455/436, 455/463; 726/14
See application file for complete search history.

(56) References Cited

U.S. PATENT DOCUMENTS 4,326,098 A * 4/1982 Bouricius et al. ........... 713/155
4,800,590 A * 1/1989 Vaughan ..................... 713/184
5,384,831 A * 1/1995 Creswell et al. ........ 379/114.05
5,721,780 A 2/1998 Ensor et al.
5,914,472 A * 6/1999 Foladare et al. ............ 235/380
6,259,909 B1 * 7/2001 Ratayczak et al. ........... 455/411
6,327,348 B1 * 12/2001 Walker et al. ........... 379/91.01

FOREIGN PATENT DOCUMENTS

| JP | 10302005 | 11/1998 |
| JP | 1166430 | 3/1999 |
| JP | 11205448 | 7/1999 |

OTHER PUBLICATIONS

Hassinen M. Hypponen, An Open, PK-1 based mobile payment system, vol. 3995, p. 86-100, 2006.*

* cited by examiner

Primary Examiner—Andrew J. Fischer
Assistant Examiner—Charlie C. L. Agwumezie
(74) Attorney, Agent, or Firm—Stevens, Davis, Miller & Mosher, LLP

(57) ABSTRACT

The service presentation apparatus includes a member database (310) for storing the information of members registered preliminarily as users, basic authentication means (321) for authenticating official members through an open information communication line (202), and mobile communication authentication means (322) for executing the authentication by way of the mobile communication terminal (102) preliminarily registered in the member database (310), while the user side includes a service terminal (101) connected to a server (300) through the open information communication line (202). In this configuration, an individual authentication system of higher accuracy will be realized. Moreover, a highly reliable accounting system is realized by applying the individual authentication system.

2 Claims, 30 Drawing Sheets

FIG. 3

| Member Name | Member ID No. | Basic Authentication Password | Mobile Communication Terminal Call No | Authentication Password via Mobile Communication |
|---|---|---|---|---|
| watanabe | NABE | GT104 | 060211 | 3023 |
| Kobayashi | HIRO | GT110 | 090320 | 5066 |
| Ikeda | KICHI | GT112 | 0702300 | 4045 |

FIG. 6

| Member Name | Member ID No. | Basic Authentication Password | Mobile Communication Terminal Call No |
|---|---|---|---|
| watanabe | NABE | GT104 | 060211 |
| Kobayashi | HIRO | GT110 | 090320 |
| Ikeda | KICHI | GT112 | 0702300 |

Fig.13

| Facility Name | Facility ID No | Facility Authentication Password | Facility Address | Service Name | Other Information |
|---|---|---|---|---|---|
| Vending Machine 1 | JI101 | MMFC | www.pep.co.jp_001 | Diet juice sale<br>Mineral water sale | Location: Sosigaya Okura 2-2-1<br>Manager: Setagaya Taro<br>Tel: 03-xx10-43xx |
| Shinjuku Parking | Park101 | pplm | www.park.co.jp_001 | Hourly Parking<br>8:00 - 10:00 ¥300/30min<br>10:00 - 8:00 ¥200/hour | Location: Tomihisa-cho 3-2-5<br>Manager: Shinjuku Taro<br>Tel: 03-22xx-43xx |

Fig.14

Example of Member DB

| Member Name | Member ID No. | Basic Authentication Password | Mobile Communication Terminal Call No. | Authentication Password via Mobile Communication | Usable Amount | Accounting record (date,amount,facility,name,service,user) |
|---|---|---|---|---|---|---|
| Watanabe | NABE | GT104 | 060211 | 3023 | ¥200,000 | (1) 5/12/00, 10:00, ¥120, Vending machin1, juice, NABEson1<br>(2) 5/12/00, 11:00, ¥1200, Saginuma swimming pool, admission, NABE1son2<br>(3) 5/12/00, 14:00, ¥750, Shinjuku Parking, parking fee, NABE<br>(4)<br>(5) |
| | NABEson1 | GT1041 | | | | |
| | NABEson2 | GT1042 | | | | |
| Kobayashi | HIRO | GT110 | 090320 | 5066 | ¥5,000 | (1) 5/2/00, 10:00, ¥120, Vending machin3, juice, HIRO<br>(2) 5/3/00, 11:00, ¥1200, Saginuma swimming pool, admission, HIRO<br>(3) 5/4/00, 14:00, ¥750, Shinjuku Parking, parking fee, HIRO |

Fig. 16

Example of Facility Control DB

| Service Name | Accounting Amount |
|---|---|
| Diet Juice | ¥120/PC |
| Juice | ¥120/PC |
| Tea (PET bottle) | ¥140/PC |

Fig.20

Example of Facility Control DB (fixed fee facility)

| Service Name | Accounting Amount |
|---|---|
| Adult ( all day ) | ¥5,400 |
| Adult ( twilight ) | ¥3,000 |
| Adult ( all day ) | ¥2,000 |
| Child ( all day ) | ¥1,000 |

Fig.24

| Index (admission capacity:3) | Admission Time | Present Accounting Amount | Remarks:Accounting Information |
|---|---|---|---|
| Nabesan | 13:00 | Present time:14:00 Charged Time: 60min ¥600 | 8:00 - 22:00 ¥300 / 30min 22:00 - 8:00 ¥200 / hour |
| HIROKAZU | 12:00 | Present time:14:00 Charged Time: 120min ¥1,200 | 8:00 - 10:00 ¥300 / 30min 10:00 - 8:00 ¥200 / hour |
| vacant | vacant | vacant | 8:00 - 10:00 ¥300 / 30min 10:00 - 8:00 ¥200 / hourt |

Fig.29

| Member Name | Member ID No. | Basic Authentication Password | Mobile Communication Terminal Call No. | Authentication Password via Mobile Communication | Usable Amount | Settlement Record (date,amount,facility,bank-account No, name,service,user) |
|---|---|---|---|---|---|---|
| Watanabe | NABE | GT104 | 060211 | 3023 | ¥200,000 | (1) 5/12/00, 10:00, ¥120, Vending machin1, 842211, juice, NABEson1<br>(2) 5/12/00, 11:00, ¥1200, Saginuma swimming pool, 272211, admission,NABE1son2<br>(3) 5/12/00, 14:00, ¥750, Shinjuku Parking, 242211, parking fee, NABE |
| | NABEson1 | GT1041 | | | | |
| | JNABEson2 | GT1042 | | | | |
| Kobayashi | HIRO | GT110 | 090320 | 5066 | ¥5,000 | (1) 5/2/00, 10:00, ¥120, Vending machin3, 842233, juice, HIRO<br>(2) 5/3/00, 11:00, ¥1200, Saginuma swimming pool, 272233, admission,HIRO<br>(3) 5/4/00, 14:00, ¥750, Shinjuku Parking, 242233, parking fee, HIRO |

INDIVIDUAL AUTHENTICATION METHOD, INDIVIDUAL AUTHENTICATION APPARATUS, ACCOUNTING METHOD, ACCOUNTING APPARATUS

FIELD OF THE INVENTION

The present invention relates to an individual authentication method and its apparatus, and an accounting method and its apparatus, used in a system for presenting service by information communication technology such as electronic commerce and network communication.

BACKGROUND OF THE INVENTION

Hitherto, in commercial contracts and transactions by means of information communication technology, whether the service receiver is the authorized subscriber or not has been authenticated by means of the identification number, password or the like.

For example, in the case of network communications, a user sends application information including personal information by using the computer and telephone line when filing for a contract. It is received at a server installed at the network provider, and the contract between the two parties is established.

At this time, to reject access by an illegal user pretending to be an official member of network communication, the following authentication procedure is known.

First, a service contract is agreed between a network communication user and the network communication provider. The network communication provider informs the official member user of the member ID number and password. When the access is requested from the user through network communication, the user requesting the access is told to send the registered member ID and password, and when the user enters them, they are collated with the official member information recorded at the network communication provider side. If matched as a result of collation, the network communication provider authorizes the access-requesting user to be the official member user.

The order information or the like sent from the user through the communication route established by this authentication is accepted as the transmission from the official member user.

Such prior art, however, had the following defects.

If a hacker invades into the transmission gate or modem of the computer of the official member user and acquires the member ID number and password of the official member user, it is difficult to reject the access by pretending action of the illegal user.

At the present, in order to prevent illegal acquisition of member ID number and password by hackers, it is attempted to assure the communication security by encrypting transmission of information between the official member user and the service provider.

However, if the means of preventing illegal acquisition of password is sophisticated and complicated, the conventional individual authentication technique is not sufficiently perfect for hackers attempting to develop more advanced illegal acquisition means.

SUMMARY OF THE INVENTION

The invention is intended to solve the problems of the prior art, and it is hence an object thereof to present a highly reliable individual authentication method and apparatus capable of rejecting pretending action by illegal user if the member ID number and password of official member user are illegally acquired by an illegal user, and an accounting method and apparatus by applying them.

A highly reliable individual authentication is realized by double steps, that is, a step of identifying the member by receiving the member ID identifying the service receiver through an open information communication line and collating with the information in the preliminarily registered member database, and a step of approving the authentication by connecting to a mobile terminal by using the number of a mobile communication terminal corresponding to the member ID preliminarily registered in the database.

If the member ID number and password of the official member user are illegally acquired by the illegal user in the open information communication line, the pretending action by the illegal user can be rejected unless possessing the mobile communication terminal corresponding to the member ID, so that a highly reliable individual authentication system can be realized.

By applying the individual authentication method and apparatus of the invention, a highly reliable accounting system is realized in the aspect of individual authentication, by connecting a service terminal device for presenting service and collecting the fee from the service receiver by the information communication line.

Thus, the invention relates to the individual authentication method, individual authentication apparatus, accounting method and accounting apparatus as set forth in the claims.

BRIEF DESCRIPTION OF THE DRAWINGS

FIG. 3 is a diagram showing an example of member user information necessary for realizing the individual authentication system in the first embodiment of the invention.

FIG. 6 is a diagram showing an example of member user information necessary for realizing the individual authentication system in the second embodiment, third embodiment, fourth embodiment, and fifth embodiment of the invention.

FIG. 13 is a diagram showing an example of member user information necessary for realizing the accounting system applying the individual authentication system in the sixth embodiment, seventh embodiment, and eighth embodiment of the invention.

FIG. 14 is a diagram showing an example of facility information necessary for realizing the accounting system applying the individual authentication system in the sixth embodiment, seventh embodiment, and eighth embodiment of the invention.

FIG. 16 is a diagram showing an example of commodity information necessary for realizing the accounting system applying the individual authentication system in the sixth embodiment of the invention.

FIG. 20 is a diagram showing an example of commodity information necessary for realizing the accounting system applying the individual authentication system in the seventh embodiment of the invention.

FIG. 24 is a diagram showing an example of commodity information necessary for realizing the accounting system applying the individual authentication system in the eighth embodiment of the invention.

FIG. 29 is a diagram showing an example of member user information necessary for realizing the accounting system applying the individual authentication system in the ninth embodiment of the invention.

DETAILED DESCRIPTION OF THE EXEMPLARY EMBODIMENTS

First Embodiment

Figure 1:
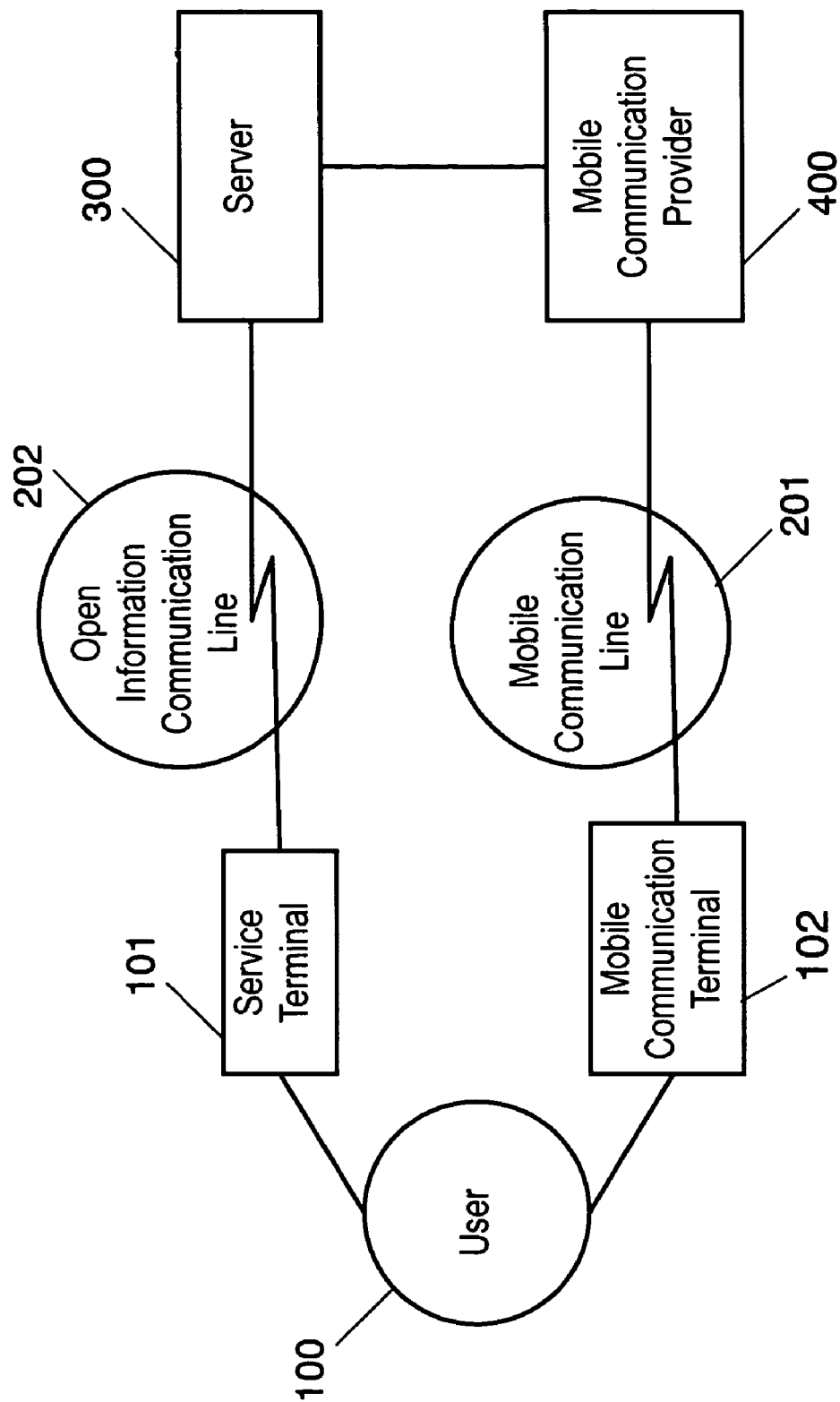
FIG. 1 is a conceptual diagram of an individual authentication system in a first embodiment of the invention.

FIG. 1 is a conceptual diagram of an individual authentication system in a first embodiment of the invention.

In FIG. 1, a server 300 owned by the service provider is connected to a service terminal 101 for presenting the service to a user 100 through an open information communication line 202. A mobile communication terminal 102 owned by the user 100 is preliminarily registered in the server 300, and is connected to a mobile communication line 201 managed by a mobile communication provider 400 of PHS or cellular phone.

Herein, the open information communication line 202 is the information communication line allowing many and unspecified users to access the service provider such as the Internet. Through this communication line 202, the server 300 presents, for example, network communication provider service, electronic commerce service, etc.

In FIG. 1, only one user 100 is shown, but in general applications, there are plural users and plural service terminals. In FIG. 1, the user 100 represents one of them.

Figure 2:
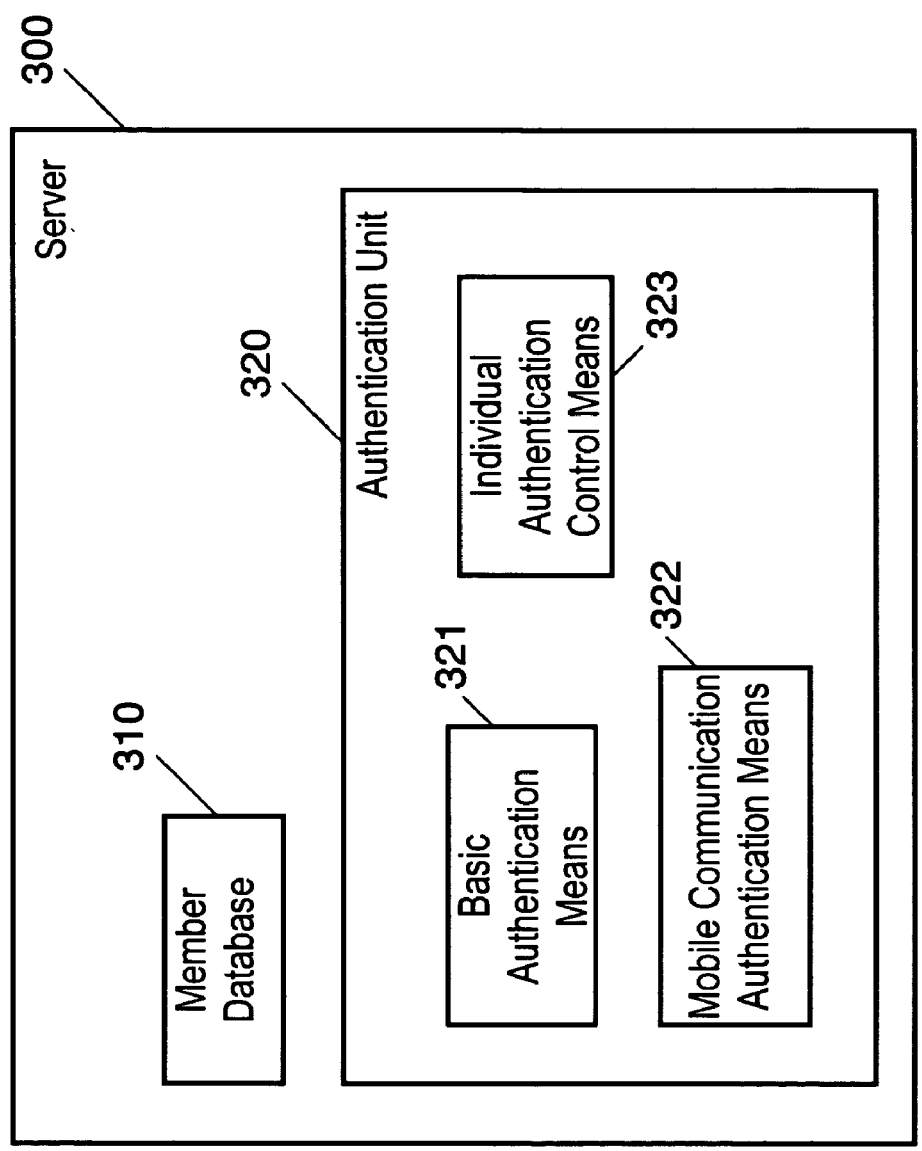
FIG. 2 is a structural conceptual diagram of a server in the individual authentication system shown in the first embodiment, second embodiment, third embodiment, fourth embodiment, and fifth embodiment of the invention.

FIG. 2 is a structural conceptual diagram of the server 300 in the embodiment. The server 300 comprises a member database (DB)=310 for storing the member user information of members preliminarily registered as service receivers, and an authentication unit 320 for authenticating and judging whether the service requesting user is an official member user or not. The individual authentication unit 320 is composed of basic authentication means 321 for authenticating the member by using the communication line 202, mobile communication authentication means 322 for authenticating the member by using the terminal 102 owned by the official member, and individual authentication control means 323 for judging the individual authentication by supervising and controlling the authentication means 321 and mobile communication authentication means 322.

FIG. 3 is a diagram showing an example of member user information necessary for realizing the individual authentication system shown in the embodiment, and the member user information is preliminarily registered and stored in the DB 310.

FIG. 3 shows an example in which user information of three members is stored. The user information consists of member name, member ID number and basic authentication password used in authentication via the communication line 202, and mobile communication terminal call number and mobile communication means authentication password used in authentication via the communication line 201.

Figure 4:
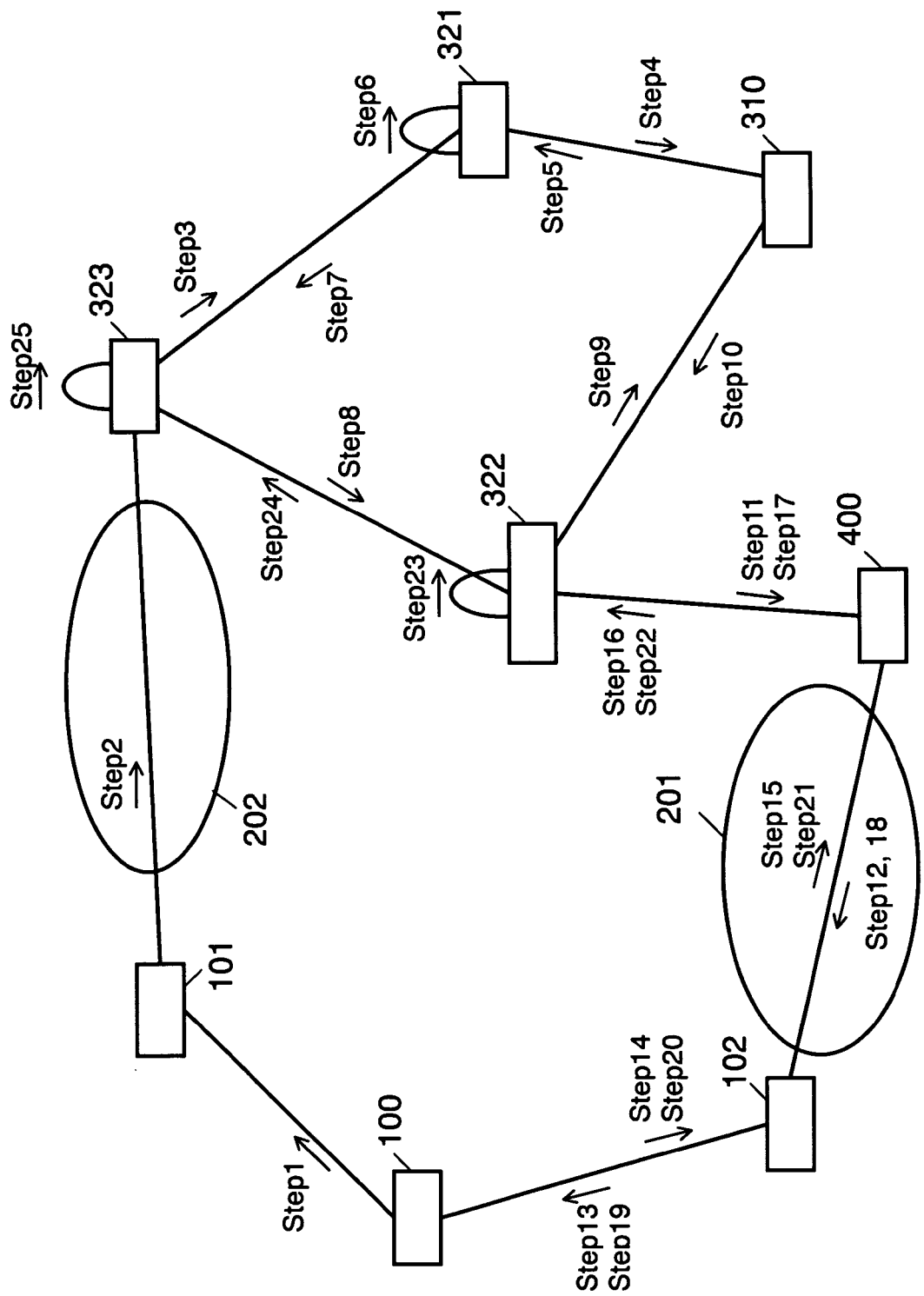
FIG. 4 is a collaboration diagram showing the authentication procedure in the individual authentication system in the first embodiment of the invention.

FIG. 4 is a collaboration diagram showing the authentication procedure in the individual authentication system in the embodiment. In FIG. 4, numerals of step 1 to step 25 indicate the sequence of authentication procedure. The operation of the individual authentication system in the embodiment is explained below while referring to FIG. 4.

<Step 1>

The user 100 enters the member ID number and basic authentication password in the terminal 101 in order to receive service presentation from the server 300 owned by the service provider shown in FIG. 1.

Herein, the member ID number and basic authentication password are noticed from the service provider when the user 100 has signed the service presentation contract with the service provider. The noticed the member ID number and basic authentication password are stored in the DB 310 of the server 300 by corresponding to the name of the user 100 and the mobile terminal call number of the terminal 102 owned by the user 100.

<Step 2>

The terminal 101 receiving the member ID number and basic authentication password transmits the member ID number and basic authentication password entered by the user to the control means 323 in the server 300 through the communication line 202, and requests individual authentication as the qualification examination of service presentation.

Herein, when transmitting the member ID number and basic authentication password through the communication line 202, in order to prevent illegal acquisition of such information, communication security may be assured by encrypting the transmission of information between the terminal 101 and the server 300.

<Step 3>

The individual authentication control means 323, having received the individual authentication request, member ID number, and basic authentication password entered by the user, sends them to the authentication means 321, and requests individual authentication of the service receiver corresponding to the member ID number <Step 4>

The authentication means 321 receiving the member ID number and basic authentication password from the control means 323 requests basic authentication password for collation corresponding to the member ID number received from the control means 323, to the DB 310.

Herein, the basic authentication password for collation is the basic authentication password corresponding to the member ID number stored in the DB 310.

<Step 5>

In response, the DB 310 executes search of member user information in the database by the keyword of the member ID number, and when discovering the same member ID number, the basic authentication password for collation corresponding to this member ID number is sent to the authentication means 321.

As a result of research, if the requested member ID number is not discovered, the DB 310 notices to the authentication means 321 that the requested member ID number is not found.

<Step 6>

The authentication means 321, when the basic authentication password for collation is sent back from the DB 310, compares the basic authentication password for collation and the basic authentication password entered by the user. If they coincide, it is judged that the basic authentication is established, and if different, it is judged that the basic authentication is not established.

Herein, if receiving the notice that the requested member ID number is not present from the DB 310, the authentication means 321 also judges that the basic authentication is not established.

<Step 7>

The authentication means 321 reports the judging result of basic authentication, together with the member ID number, to the control means 323.

<Step 8>

The control means 323, if the result of authentication sent from the authentication means 321 is establishment of authentication, sends the member ID number to the authentication means 322, and requests authentication via the mobile communication.

Herein, if the result of basic authentication sent from the authentication means 321 is failure in establishment, the individual authentication control means 323 reports that the service cannot be presented because the individual authentication is not established to the terminal 101, and terminates the individual authentication procedure.

<Step 9>

The authentication means 322 receiving the member ID number from the control means 323 requests the DB 310 to send the authentication password via mobile communication for collation and mobile communication terminal call number corresponding to the member ID number.

Herein, the authentication password via mobile communication for collation is the authentication password via mobile communication corresponding to the member ID number stored in the DB 310.

<Step 10>

The DB 310 executes retrieval of member user information in the database by the keyword of the requested member ID number. If the identical member ID number is discovered, the authentication password via mobile communication for collation and mobile communication terminal call number corresponding to the member ID number are sent to the authentication means 322.

If the requested member ID number is not found, the DB 310 reports the authentication means 322 that the requested member ID is not present.

<Step 11>

When the authentication password via mobile communication for collation and mobile communication terminal call number are sent from the DB 310, the authentication means 322 requests line connection to the terminal 102 by using the mobile communication terminal call number, to the provider 400. Incidentally, if the mobile communication authentication means 322 receives the notice that the requested member ID number is not present from the DB 310, the communication means 322 judges that the basic authentication is not established, and advances to step 24.

The communication line used when transmitting the line connection request from the authentication means 322 to the provider 400, may be either exclusive line or public line such as telephone network.

<Step 12> to <Step 15>

The manipulation at step 12, step 13, step 14 and step 15 differs depending on the line connection method of the mobile communication provider 400. A general line connection method of cellular phone is explained below.

<Step 12>

The provider 400 requests line connection to the mobile communication terminal 102 by using the mobile communication line 201. Herein, if the terminal 102 is used in other communication and cannot be connected to the line, the provider 400 judges the line connection is a failure, and advances to step 16.

<Step 13>

The mobile communication terminal 102 receiving line connection request from the provider 400 informs the user 100 that the line connection is requested, by means of beeper or vibrator.

<Step 14>

The user 100 replies to the line connection request by pressing the reply button or the like provided in the terminal 102.

<Step 15>

The terminal 102 notices the reply of the user 100 to the provider 400 by using the mobile communication line 201, and sets a line in the mobile communication line 201.

<Step 16>

The provider 400 notices the line connection result to the mobile communication authentication means 322. Herein, the authentication means 322 judges that the authentication via mobile communication is not established when the line connection result is a failure. It advances to step 24.

<Step 17> to <Step 19>

When the line connection result from the provider 400 is successful, the authentication means 322 requests input of authentication password via mobile communication to the user 100 by using the line set up in the communication line 201.

Herein, the authentication password via mobile communication is noticed from the service provider when the user 100 has signed the service presentation contract with the service provider. The noticed authentication password via mobile communication is stored in the member database (DB) 310 in the server 300 owned by the service provider in correspondence to the name of the user 100 and the mobile terminal call number of the mobile communication terminal 102 owned by the user 100.

If an illegal user has obtained the basic authentication password and member ID number of the official member user by some way or other and requests presentation of service by pretended to be the official member user, the official member user receives the input request of authentication password via mobile communication from the terminal 102, and comes to know that an illegal use has been requested.

<Step 20> to <Step 22>

When the user 100 enters the authentication password via mobile communication in the terminal 102, the password is sent to the authentication means 322 through the line set up in the communication line 201.

<Step 23>

The authentication means 322, when the authentication password via mobile communication by user input is returned, compares and collates the authentication password via mobile communication for collation and authentication password via mobile communication by user input. If they coincide, it is judged that the authentication via mobile communication is established, and if different, it is judged that the authentication via mobile communication is not established.

<Step 24>

The authentication means 322 notices the result of authentication via mobile communication, together with the member ID number, to the control means 323.

<Step 25>

The control means 323, if the result of authentication sent from the authentication means 322 is establishment of authentication via mobile communication, judges that the individual authentication is successful, and starts presentation of service to the terminal 101 from the server 300.

If the result of authentication is failure of authentication via mobile communication, the individual authentication control means 323 informs the terminal 101 that the service cannot be presented because the individual authentication is unsuccessful, and terminates the individual authentication procedure.

Thus, the authentication method or apparatus of the invention comprises the individual authentication control means for authenticating by using the basic authentication means for authenticating by comparing and collating the member ID entered by the user and the basic authentication password such as ID number, with the basic authentication password for collation stored already in the member database, and the authentication means via mobile communication for authenticating by calling the mobile communication terminal of the user registered in the member database. Accordingly, if the member ID number and basic authentication password are illegally acquired and used in an open information communication line, illegal use can be rejected unless the illegal user simultaneously possesses the mobile communication terminal corresponding to the member ID number. Moreover, an attempt of illegal access can be noticed to the official member holding the mobile communication terminal.

Second Embodiment

Figure 5:
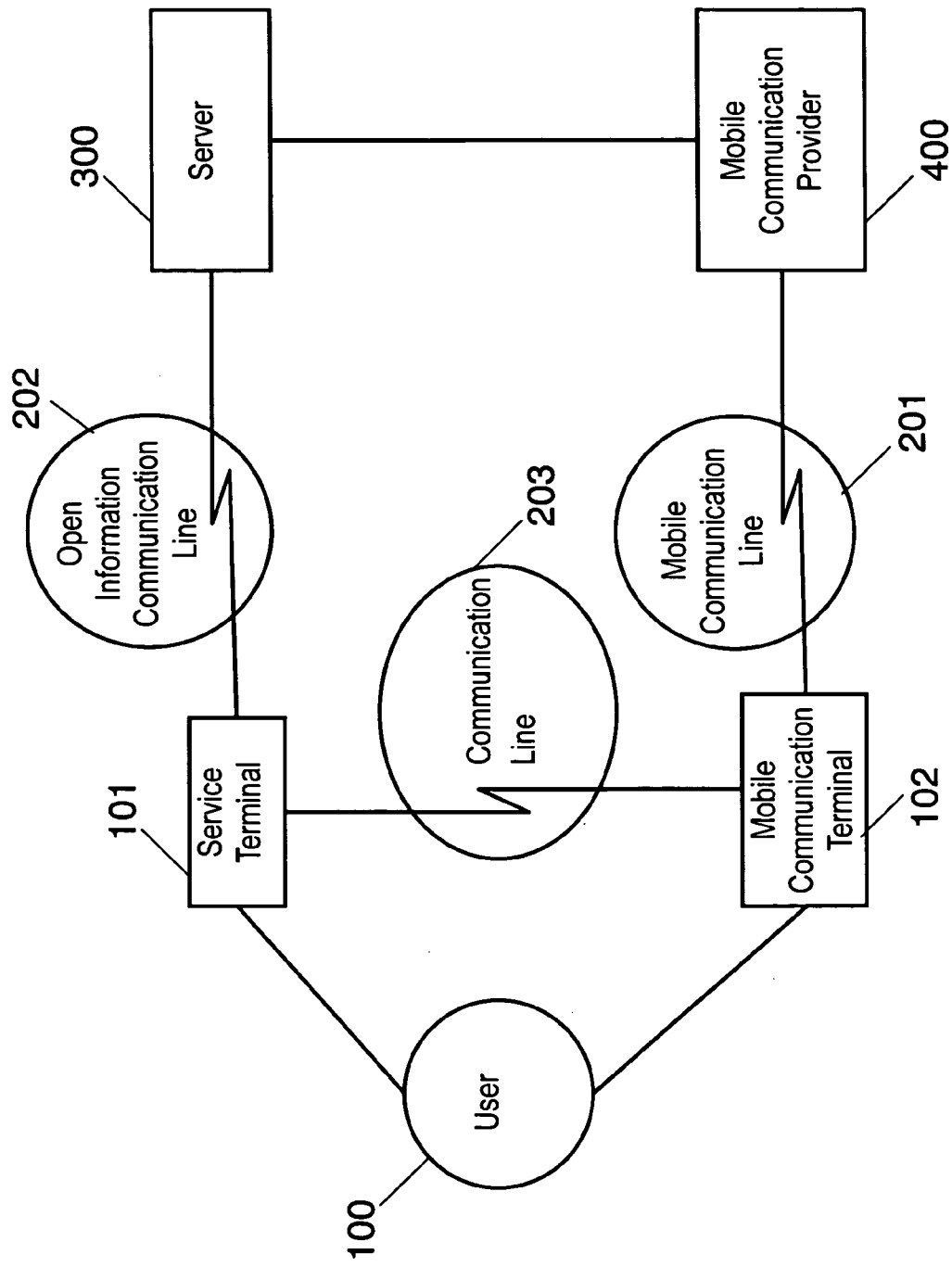
FIG. 5 is a conceptual diagram showing the individual authentication system in the second embodiment, third embodiment, fourth embodiment, and fifth embodiment of the invention.

FIG. 5 is a conceptual diagram showing the individual authentication system in the second embodiment. In FIG. 5, the user 100, mobile communication line 201, open information communication line 202, server 300, and mobile communication provider 400 are same as in the individual authentication system in FIG. 1.

The difference of this embodiment from the first embodiment is that the service terminal 101 and the mobile communication terminal 102 are connected by using a communication line 203 between the service terminal 101 and mobile communication terminal 102 in the case of individual authentication. The service terminal 101 has an interface function for connecting with the communication line 203 and a response function to the call from the mobile communication terminal 102, in addition to the functions in the first embodiment.

The mobile communication terminal 102 has an interface function for connecting with the communication line 203 in addition to the functions in the first embodiment. Herein, the communication line 203 between the service terminal 101 and mobile communication terminal 102 is a communication line by wired means, wireless means or acoustic coupler.

FIG. 6 is a diagram showing an example of member user information necessary for realizing the individual authentication system in the embodiment. The member user information is preliminarily registered in the member database (DB) 310 shown in FIG. 2.

In FIG. 6, the user information of three members is stored. The member information consists of the member name and member ID number, basic authentication password used in authentication via the communication line 202, and mobile communication terminal call number used in authentication via mobile communication line 201.

Figure 7:
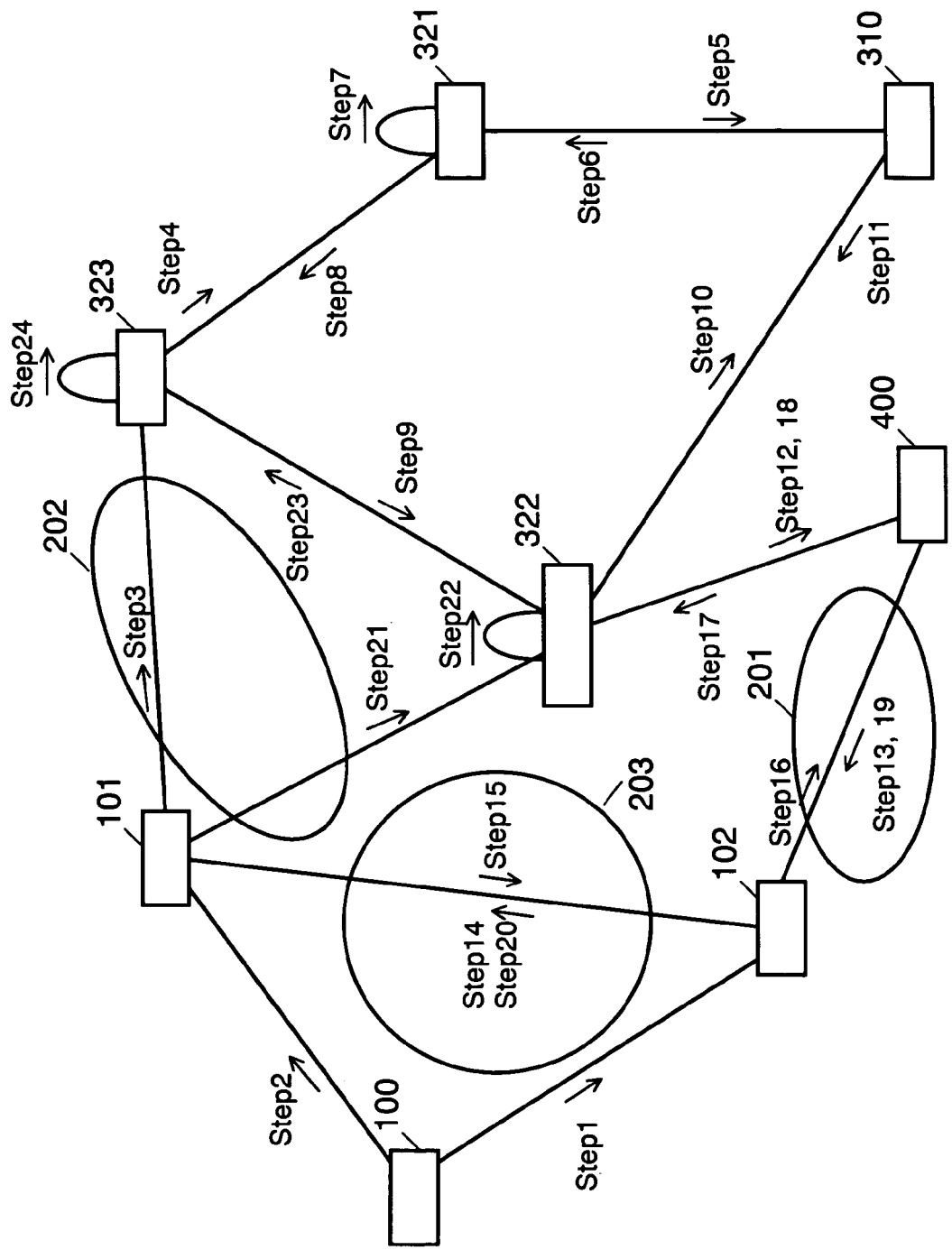
FIG. 7 is a collaboration diagram showing the authentication procedure in the individual authentication system in the second embodiment of the invention.

FIG. 7 is a collaboration diagram showing the authentication procedure in the individual authentication system in the embodiment. In FIG. 7, numerals of step 1 to step 24 indicate the sequence of procedure of authentication. The operation of individual authentication system of the embodiment is explained below while referring to FIG. 7.

<Step 1>

The user 100 connects the own terminal 102 to the terminal 101 by using the communication line 203 between service terminal 101 and mobile communication terminal 102.

<Step 2> to <Step 9>

From request of service presentation by the user 100 till establishment of basic authentication is same as in step 1 to step 8 in the first embodiment shown in FIG. 4.

<Step 10>

The mobile communication authentication means 322 receiving the member ID number from the individual authentication control means 323 requests the mobile communication terminal call number corresponding to the member ID number.

<Step 11>

The DB 310 executes search of member user information in the database by the key word of member ID number. When the same member ID number is found, the mobile communication terminal call number corresponding to this member ID number is sent to the authentication means 322.

As a result of search, if the requested member ID number is not found, the DB 310 notices to the authentication means 322 that the member ID is not found.

<Step 12>

The authentication means 322, when the mobile communication terminal call number is returned from the DB 310, requests line connection to the terminal 102 by using the mobile communication terminal call number to the provider 400. If the authentication means 322 receives the notice of absence of member ID number to be searched from the DB 310, the authentication means 322 judges that the basic authentication is not established and skips to step 23.

The communication line used when transmitting line connection request from the authentication means 322 to the provider 400 may be either exclusive line or public line such as telephone network.

<Step 13>

The provider 400 requests line connection to the terminal 102 by using the mobile communication line 201. Herein, if the terminal 102 is used in other communication and the line cannot be connected, the provider 400 judges line connection failure, and skips to step 17.

<Step 14>

The terminal 102, receiving line connection request from the provider 400, notices reception of line connection request to the terminal 101 by using the communication line 203.

<Step 15>

The terminal 101 notices response to the line connection request to the terminal 102 by using the communication line 203.

<Step 16>

The terminal 102 notices the reception of the response from the terminal 101 to the provider 400 by using the mobile communication line 201.

<Step 17>

The provider 400 notices the result of line connection to the authentication means 322. The authentication means 322 judges that the authentication via mobile communication is unsuccessful when the line connection result sent from the provider 400 is line connection failure, and skips to step 23.

<Step 18>

When the line connection result from the provider 400 is successful connection, the authentication means 322 sends a test signal to the provider 400, and the sent test signal is stored as transmission test signal.

Herein, the test signal may be an arbitrary signal generated by using random number or the like. Or an arbitrary signal stored preliminarily in the authentication means 322 may be used.

<Step 19>

The provider 400 sends the test signal to the terminal 102 by using the line set in the communication line 201.

<Step 20>

The terminal 102 sends the test signal to the terminal 101 by using the communication line 203.

<Step 21>

The terminal 101 sends the test signal to the authentication means 322 by using the communication line 202.

<Step 22>

The authentication means 322 compares the received test signal and the stored transmission test signal. When matched, it is judged that the authentication via mobile communication is established, and if not matched, it is judged that the authentication via mobile communication is not established.

<Step 23>

The mobile communication authentication means 322 notices the authentication result of authentication via mobile communication to the individual authentication control means 323 together with the member ID number.

<Step 24>

The control means 323 judges that the individual authentication is successful when the authentication result sent from the authentication means 322 is establishment of authentication via mobile communication, and starts presentation of service from the server 300 to the terminal 101.

If the authentication via mobile communication is not established, the control means 323 notices to the terminal 101 that the service cannot be presented because the individual authentication is not established. Then the individual authentication is terminated.

It is thus a feature of the invention that the service terminal requesting service and mobile communication terminal registered in the member database are connected by using the communication line between the service terminal and the mobile communication terminal. If the member ID number and basic authentication password are illegally acquired and used in an open information communication line, illegal use can be rejected unless the illegal user simultaneously possesses the mobile communication terminal corresponding to the member ID number.

Third Embodiment

The configuration of the individual authentication system in a third embodiment of the invention is same as that of the individual authentication system in the second embodiment shown in FIG. 5. The member user information necessary for realizing the individual authentication system shown in the embodiment is also same as the member information in the second embodiment shown in FIG. 6.

Figure 8:
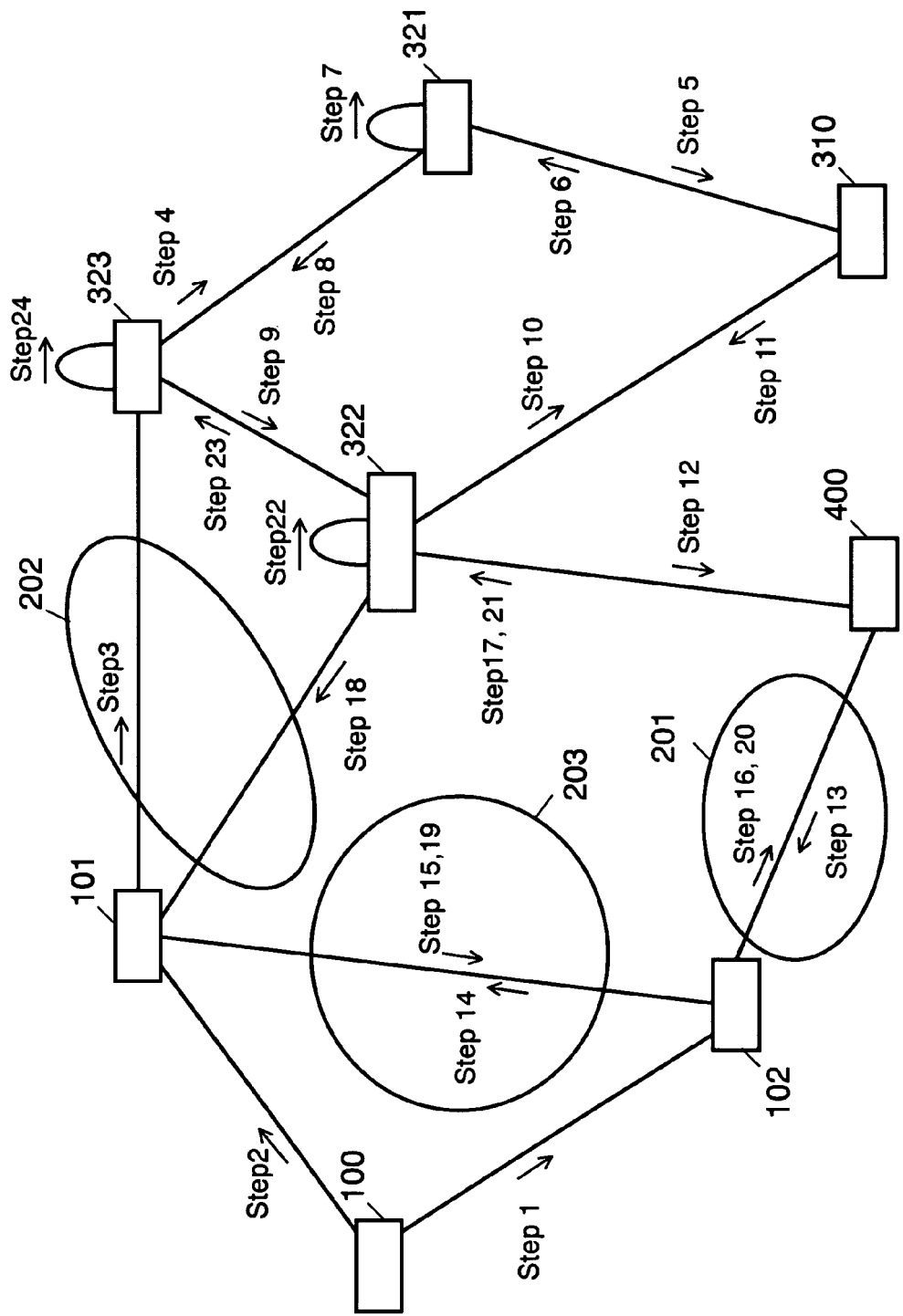
FIG. 8 is a collaboration diagram showing the authentication procedure in the individual authentication system in the third embodiment of the invention.

Between this embodiment and the second embodiment, the authentication procedure is different, and FIG. 8 is a collaboration diagram showing the authentication procedure in the individual authentication system in the embodiment, and numerals of step 1 to step 24 in FIG. 8 show the sequence of the authentication procedure. The operation of the individual authentication system of the embodiment is explained below while referring to FIG. 8.

<Step 1> to <Step 17>

The procedure from connection of service terminal 101 and mobile communication terminal 102 and establishment of basic authentication of the user 100 till line setting between the mobile communication terminal 102 and mobile communication authentication means 322 on the mobile communication line 201 is same as in the procedure of step 1 to step 17 in individual authentication in the second embodiment shown in FIG. 7.

<Step 18>

When the line connection result from the provider 400 is successful line connection, the authentication means 322 sends a test signal to the terminal 101 by using the open information communication line 202, and the authentication means 322 stores the sent test signal.

Herein, the test signal may be an arbitrary signal generated by using random number or the like. Or an arbitrary signal stored preliminarily in the authentication means 322 may be used.

<Step 19>

The terminal 101 sends the test signal to the terminal 102 by using the communication line 203 between the service terminal and mobile communication terminal.

<Step 20>

The terminal 102 sends the test signal to the provider 400 by using the line set in the communication line 201.

<Step 21>

The provider 400 sends the test signal to the authentication means 322.

<Step 22>

The authentication means 322 compares the received test signal and the stored transmission test signal. When matched, it is judged that the authentication via mobile communication is established, and if not matched, it is judged that the authentication via mobile communication is not established.

<Step 23>

The authentication means 322 notices the authentication result of authentication via mobile communication to the control means 323 together with the member ID number.

<Step 24>

The control means 323 judges that the individual authentication is successful when the authentication via mobile communication is established, and starts presentation of service from the server 300 to the terminal 101.

If the authentication via mobile communication is not established, the control means 323 notices to the terminal 101 that the service cannot be presented because the individual authentication is not established. Then the individual authentication is terminated.

Thus, according to the invention, after execution of authentication by the basic authentication means, the mobile communication authentication means sends a test signal to the service terminal by using the open communication line, and receives the test signal by way of the mobile communication terminal and mobile communication line, and the transmitted test signal and received test signal are compared, and when matched, it is judges that the authentication is successful. If the member ID number and basic authentication password are illegally acquired and used in an open information communication line, illegal use can be rejected unless the illegal user simultaneously possesses the mobile communication terminal corresponding to the member ID number.

Fourth Embodiment

Figure 9:
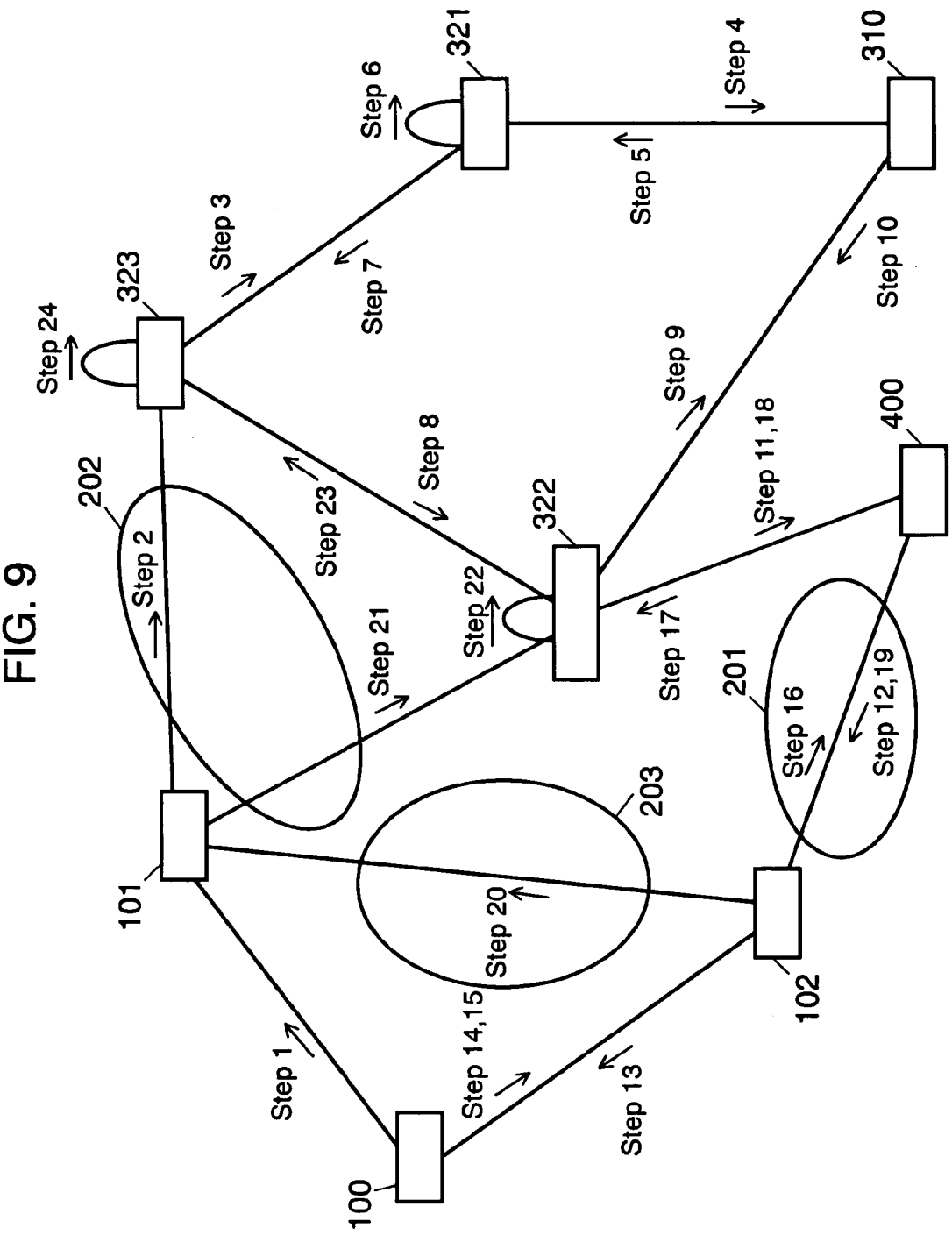
FIG. 9 is a collaboration diagram showing the authentication procedure in the individual authentication system in the fourth embodiment of the invention.

The configuration of the individual authentication system in a fourth embodiment of the invention is same as that of the individual authentication system in the second embodiment shown in FIG. 5. The member user information necessary for realizing the individual authentication system shown in the embodiment is also same as the member information in the second embodiment shown in FIG. 6. Between this embodiment and the second embodiment, the authentication procedure is different. FIG. 9 is a collaboration diagram showing the authentication procedure in the individual authentication system in the embodiment.

Herein, numerals of step 1 to step 24 in FIG. 9 show the sequence of the authentication procedure. The operation of the individual authentication system of the embodiment is explained below while referring to FIG. 9.

<Step 1> to <Step 12>

The procedure from request of service presentation by the user 100 till establishment of basic authentication and call operation of the terminal 102 is same as in the procedure of step 2 to step 13 in individual authentication in the second embodiment shown in FIG. 7.

<Step 13>

The terminal 102 receiving a request of line connection from the provider 400 notices to the user 100 by using beeper or vibrator.

<Step 14>

The user 100 connects the own terminal 102 to the terminal 101 through the communication line 203.

<Step 15>

The user 100 replies to the line connection request by pressing the response button or the like provided in the terminal 102. This response action may be done automatically by the communication between the terminal 102 and terminal 101 at step 14.

<Step 16>

The terminal 102 notices the response to the provider 400 by way of the line 201.

<Step 17>

The provider 400 notices the result of line connection to the authentication means 322. The authentication means 322 judges that the authentication via mobile communication is unsuccessful when the line connection result sent from the provider 400 is failure, and skips to step 23.

<Step 18>

When the line connection result from the provider 400 is successful, the authentication means 322 sends a test signal to the provider 400, and the sent test signal is stored. Herein, the test signal may be an arbitrary signal generated by using random number or the like. Or an arbitrary signal stored preliminarily in the authentication means 322 may be used.

<Step 19>

The provider 400 sends the test signal to the terminal 102 by using the communication line 201.

<Step 20>

The terminal 102 sends the test signal to the terminal 101 by way of the communication line 203.

<Step 21>

The terminal 101 sends the test signal to the authentication means 322 by way of the communication line 202.

<Step 22>

The authentication means 322 compares the received test signal and the stored transmission test signal. When matched, it is judged that the authentication via mobile communication is established, and if not matched, it is judged that the authentication via mobile communication is not established.

<Step 23>

The authentication means 322 notices the authentication result of authentication via mobile communication to the control means 323 together with the member ID number.

<Step 24>

The control means 323 judges that the individual authentication is successful when the authentication result sent from the authentication means 322 is established, and starts presentation of service from the server 300 to the terminal 101.

If the authentication result is not established, the control means 323 notices to the terminal 101 that the service cannot be presented because the individual authentication is not established. Then the individual authentication is terminated.

Fifth Embodiment

The configuration of the individual authentication system in a fifth embodiment of the invention is same as that of the individual authentication system in the second embodiment shown in FIG. 5. The member user information necessary for realizing the individual authentication system shown in the embodiment is also same as the member information in the second embodiment shown in FIG. 6.

Between this embodiment and the second embodiment, the authentication procedure is different.

Figure 10:
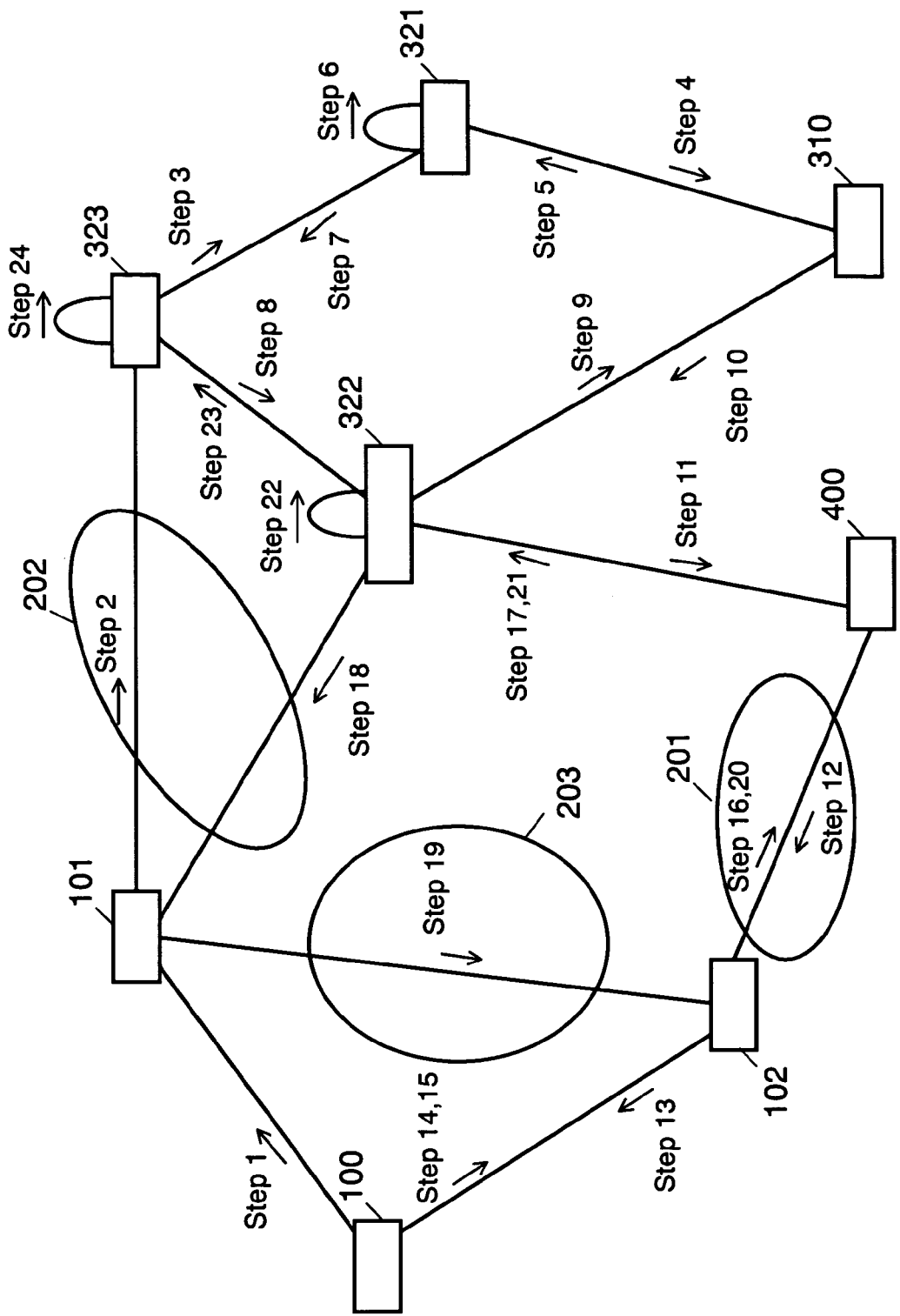
FIG. 10 is a collaboration diagram showing the authentication procedure in the individual authentication system in the fifth embodiment of the invention.

FIG. 10 is a collaboration diagram showing the authentication procedure in the individual authentication system in the embodiment. Herein, numerals of step 1 to step 24 in FIG. 10 show the sequence of the authentication procedure.

The operation of the individual authentication system of the embodiment is explained below while referring to FIG. 10.

<Step 1> to <Step 17>

The procedure of step 1 to step 17 in this embodiment is same as in the procedure of step 1 to step 17 in individual authentication in the fourth embodiment.

<Step 18>

When the line connection result from the provider 400 is successful, the authentication means 322 sends a test signal to the service terminal 101 by using the open information communication line 202, and stores the sent test signal as a transmission test signal.

Herein, the test signal may be an arbitrary signal generated by using random number or the like. Or an arbitrary signal stored preliminarily in the authentication means 322 may be used.

<Step 19>

The terminal 101 sends the test signal to the terminal 102 through the communication line 203 between service terminal and mobile communication terminal.

<Step 20>

The terminal 102 sends the test signal to the provider 400 by using the line set in the communication line 201.

<Step 21>

The provider 400 sends the test signal to the authentication means 322.

<Step 22>

The authentication means 322 compares the received test signal and the stored transmission test signal. When matched, it is judged that the authentication via mobile communication is established, and if not matched, it is judged that the authentication via mobile communication is not established.

<Step 23>

The authentication means 322 notices the result of authentication via mobile communication to the control means 323 together with the member ID number.

<Step 24>

The control means 323 judges that the individual authentication is successful when the authentication result sent from the authentication means 322 is established, and starts presentation of service from the server 300 to the terminal 101.

If the authentication result is not established, the control means 323 notices to the terminal 101 that the service cannot be presented because the individual authentication is not established. Then the individual authentication is terminated.

Sixth Embodiment

Figure 11:
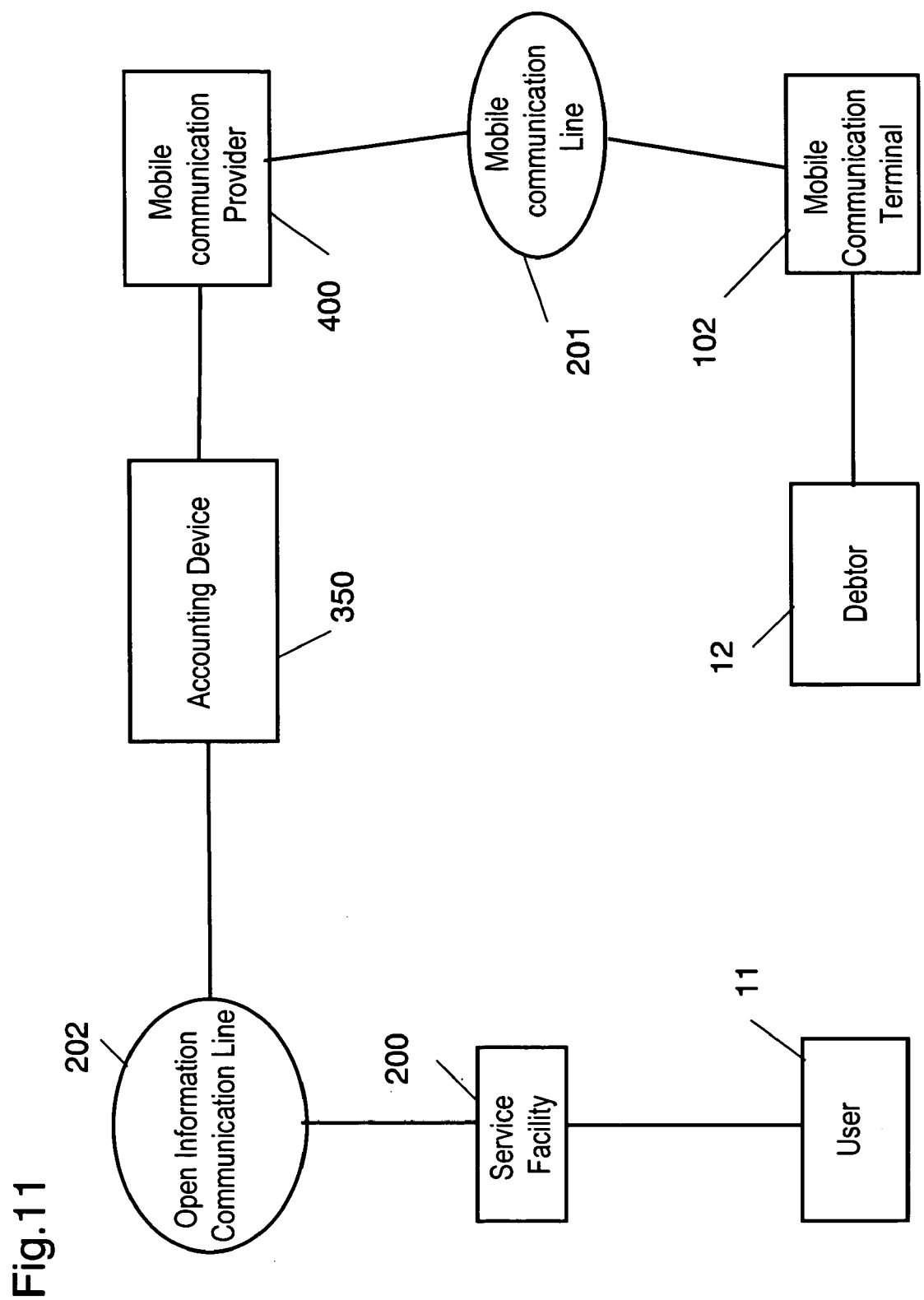
FIG. 11 is a structural outline diagram of an accounting system applying the individual authentication system in sixth embodiment, seventh embodiment, eighth embodiment, and ninth embodiment of the invention.

FIG. 11 is a structural outline diagram of an accounting system of a service facility such as an automatic vending machine applying the individual authentication system in a sixth embodiment of the invention. The accounting system shown in FIG. 11 comprises (1) a service facility 200 owned by a service provider for supplying service to a user 11, and accounting for the supplied service, (2) an accounting device 350 for authenticating the user 11 and executing accounting according to the inquiry from the service facility 200, (3) a mobile communication terminal 102 owned by debtor 12, and registered preliminarily in the accounting device 350, (4) a mobile communication provider 400 of PHS or cellular phone, supervising the mobile communication terminal 102, (5) an open information communication line 202 for connecting the service facility 200 and the accounting device 350, and (6) a mobile communication line 201 for connecting the mobile communication provider 400 and the mobile communication terminal 102.

Herein, the open information communication line 202 is an line that can be accessed by many and unspecified users or the service facility, such as the Internet. The accounting device 350 connected to the communication line 202 presents cash-less accounting service or the like for handling selling of commodities of the automatic vending machine as the service facility.

The service facility 200 is, in general application, connected to the communication line 202 in a plurality of units, but only one unit is shown in FIG. 11.

The user 11 and the debtor 12 are supposed herein to be different persons, but the user and the debtor may a same person.

Also, the accounting device 350 and the mobile communication provider 400 are indicated herein as different elements, but the accounting device 350 may be regarded to be included in the mobile communication provider 400.

Figure 12:
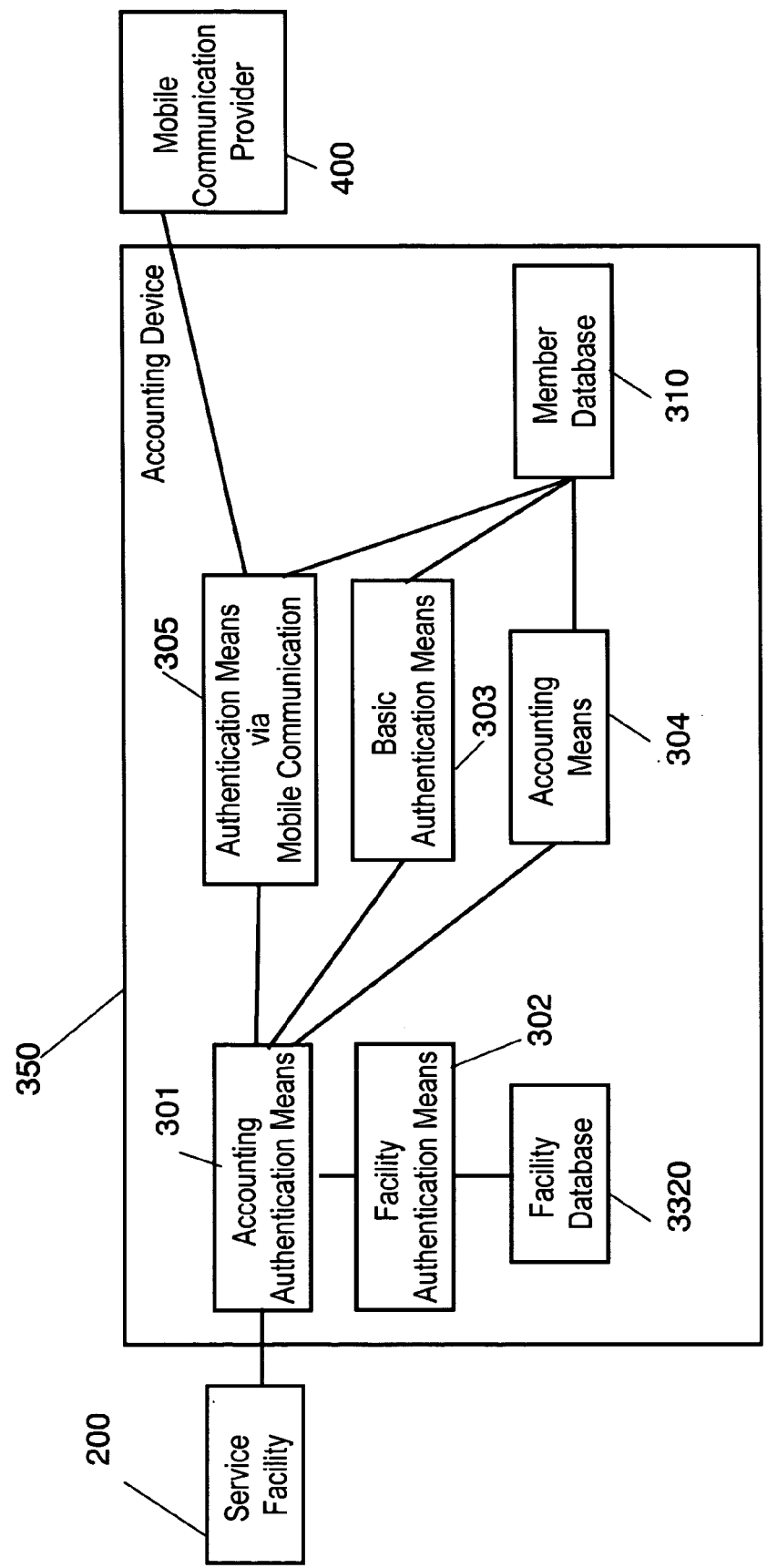
FIG. 12 is a conceptual diagram showing the structure of an accounting apparatus of the accounting system applying the individual authentication system in the sixth embodiment, seventh embodiment, and eighth embodiment of the invention.

FIG. 12 is a conceptual diagram showing the structure of the accounting device 350 in the embodiment. As shown in FIG. 12, the accounting device 350 comprises (1) a member database 310 storing member user information of members preliminarily registered as the user 11 and debtor 12, (2) a facility database 3320 storing facility information of the service facility 200 as the object of accounting service, (3) facility authentication means 302 for authenticating and judging whether the service facility 200 requesting accounting service is the preliminarily registered service facility or not, (4) basic authentication means 303 for authenticating and judging that the user 11 requesting service to the service facility 200 is an official member or not, by using an open information communication line 202, (5) mobile communication authentication means 305 for authenticating and judging to supply service to the user 11 or not, by using a mobile communication terminal owned by the debtor 12 corresponding to the user 11, (6) accounting means 304 for accounting the debtor 12 on the basis of the authentication results at the basic authentication means 303 and mobile communication authentication means 305, and (7) accounting authentication means 301 for judging the individual authentication and executing the accounting, by comprehensively managing the facility authentication means 302, basic authentication means 303, accounting means 304, and mobile communication authentication means 305.

FIG. 13 is a diagram showing an example of facility information necessary for realizing the accounting system of service facility 200 such as automatic vending machine in the sixth embodiment. The facility information is registered preliminarily in the facility database (DB) 3320. The facility information consists of (1) facility name, (2) facility ID used for facility authentication via the communication line, (3) facility authentication password, (4) facility address necessary for communication, (5) selectable service name showing the type of service that can be executed by the facility 200, and (6) other information showing the position of installation, etc.

FIG. 14 is a diagram showing an example of member user information necessary for realizing the accounting system of the service facility 200. The member user information is preliminarily registered in the DB 310. FIG. 14 shows an example of registration of user information of two members. The member information consists of (1) member's name, (2) at least one member ID number used by the user 11 when asking for authentication via the communication line 202, (3) basic authentication password corresponding to the member ID number, (4) one mobile communication terminal call number used in authentication via the communication line 201 and judgment whether or not to supply service, (5) authentication password via mobile communication, (6) usable amount of money showing the usable amount of money at the time of accounting, and (7) accounting record.

Figure 15:
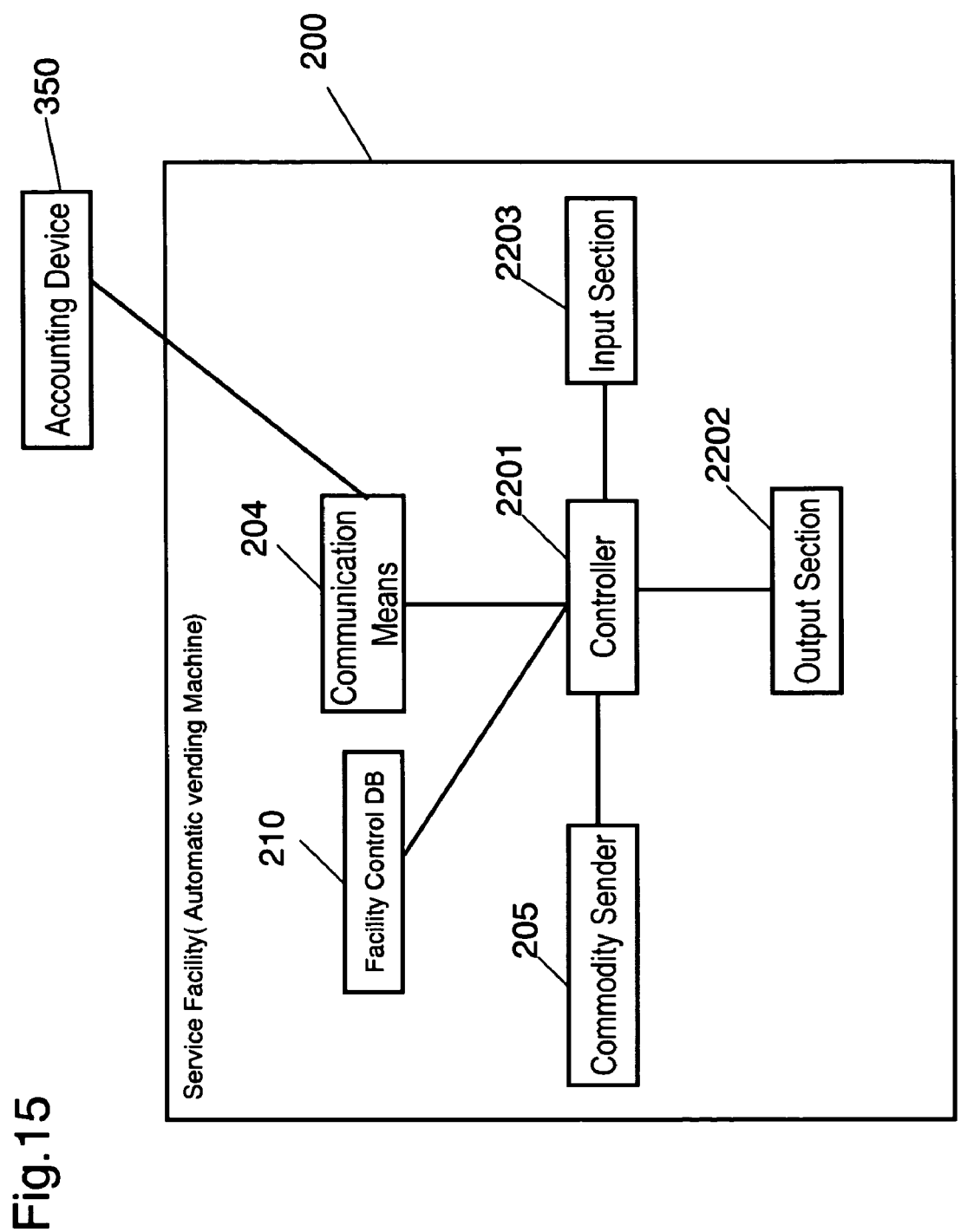
FIG. 15 is a conceptual diagram showing a structure of a service facility of the accounting system applying the individual authentication system in the sixth embodiment of the invention.

FIG. 15 is a conceptual diagram showing a structure of the service facility 200 assuming automatic vending machines such as ticket vending machine, juice vending machine and cigarette vending machine in the embodiment. The service facility 200 comprises (1) an input section 2203 used by the user 11 for entering information by means of keyboard, button, touch panel, etc., (2) an output section 2202 for displaying the information of the service facility 200 to the user by means of liquid crystal display, LED device, cathode-ray tube, etc., (3) a commodity sender 205 for supplying the commodity requested by the user 11 to the user, (4) a facility control database (DB) 210 for storing the information of commodities that can be presented, (5) communication means 204 for communicating with the accounting device 350 through the communication line 202, and (6) a controller 2201 for controlling the output section 2202, input section 2203, communication means 204, and commodity sender 205.

FIG. 16 is a diagram showing an example of commodity information necessary for realizing the accounting system of the service facility 200 such as automatic vending machine by applying the individual authentication system in the embodiment. The commodity information is preliminarily registered in the facility control DB 210. FIG. 16 shows an example of storing commodity information of three kinds. The commodity information consists of commodity name and accounting amount.

Figure 17:
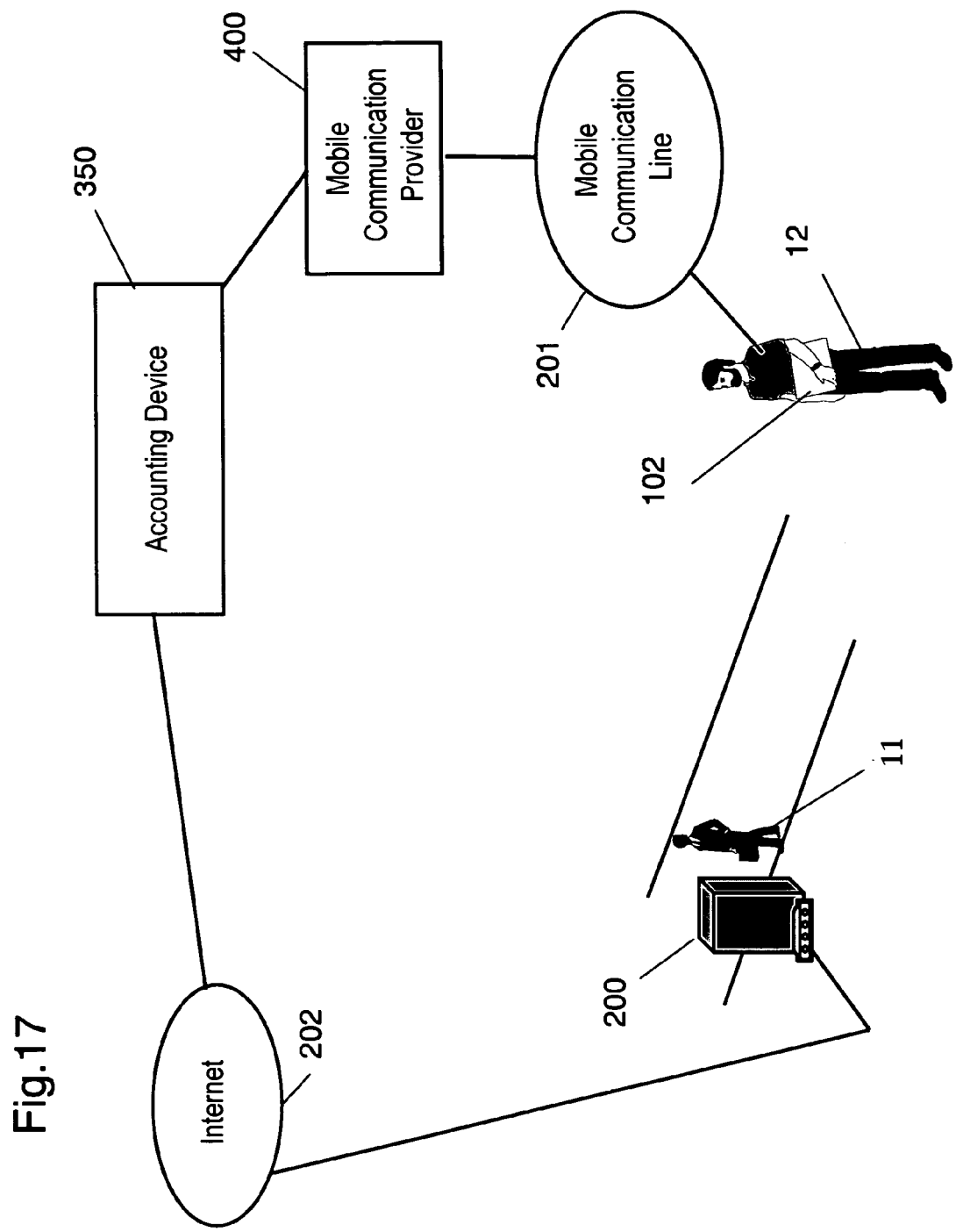
FIG. 17 is a diagram showing an example of physical configuration of the accounting system applying the individual authentication system in the sixth embodiment of the invention.

FIG. 17 is a diagram showing an example of physical configuration of the service facility 200 by applying the individual authentication system in the sixth embodiment of the invention, and its accounting system. FIG. 17 shows (1) the juice vending machine 200, (2) the user 11 attempting to buy juice from the juice vending machine 200, (3) the accounting device 350 for authenticating the individual and executing the accounting for the cash-less juice buying request from the user 11 by connecting with the juice vending machine 200 through the communication line 202, (4) the debtor 12 for proving the authentication of the user 11 desiring to buy the juice, and deciding accounting for juice purchase, (5) a movable terminal 102 for displaying the authentication proof request from the accounting device 350 and service permission to the debtor 12 whenever and wherever, allowing to make an input, (6) a mobile communication network 201 for connecting the accounting device 350 and mobile terminal 102 whenever and wherever, and (7) a mobile communication provider 400 supervising the mobile communication network.

The user 11 and the debtor 12 are supposed herein to be different persons, but the user and the debtor may a same person.

Figure 18:
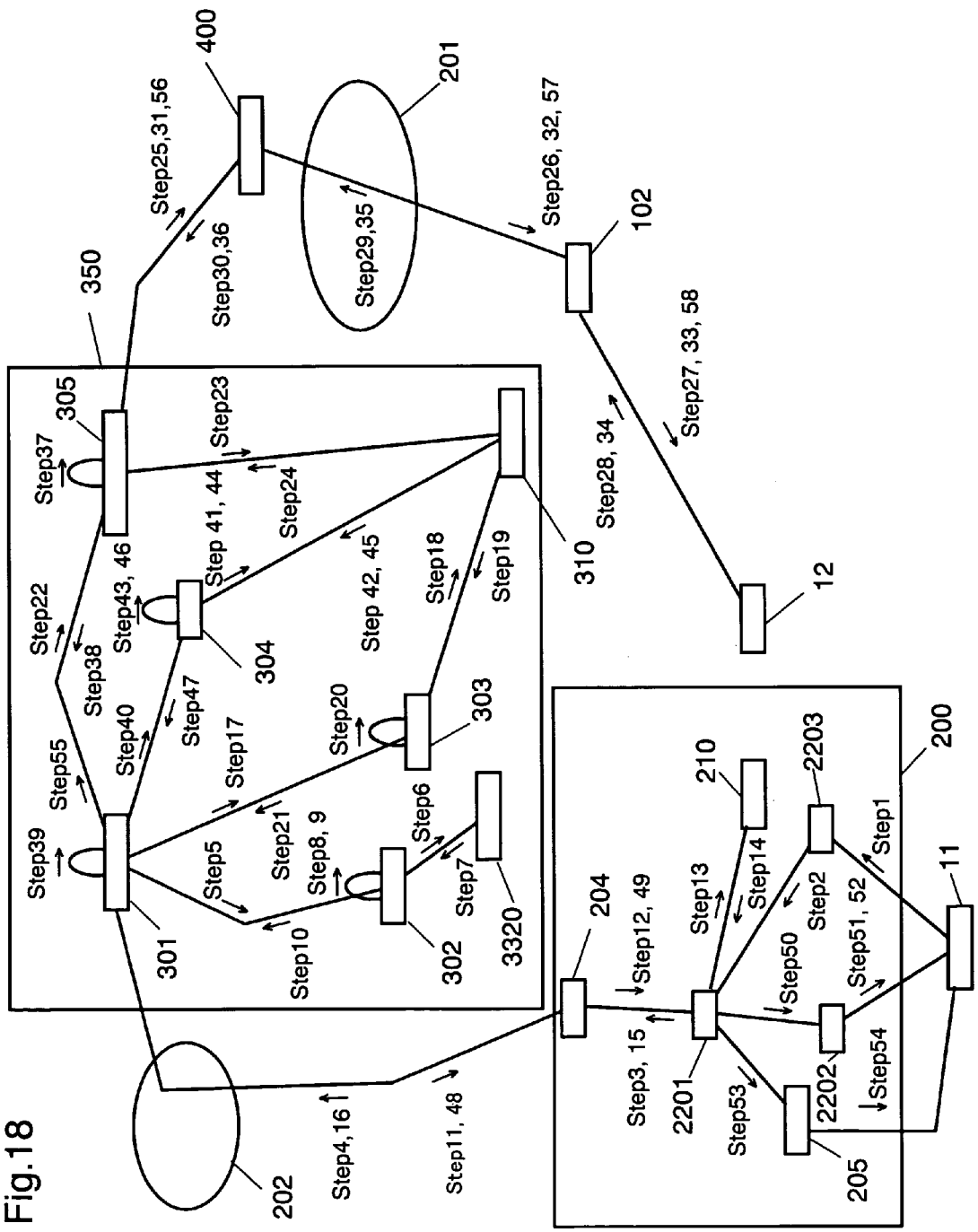
FIG. 18 is a collaboration diagram showing the authentication and accounting procedure of the accounting system applying the individual authentication system in the sixth embodiment of the invention.

FIG. 18 is a collaboration diagram showing the individual authentication and accounting procedure of the accounting system of the service facility 200 such as automatic vending machine by applying the individual authentication system in the embodiment. Numerals of step 1 to step 58 show the sequence of processing procedure. The operation of the accounting system of the service facility 200 applying the individual authentication system is explained below while referring to FIG. 18.

<Step 1>

The user 11 enters, for example, selection service for cash-less purchase of juice, member ID and basic authentication password in the input section 2203.

Herein, the member ID and basic authentication password are those noticed from the accounting service provider when making the accounting service presentation contract between the debtor 12 and the accounting service provider operating the accounting device 350. The noticed member ID and basic authentication password are stored in the member database (DB) 310, in correspondence to the name of the debtor 12 or user 11, and the mobile terminal call number of the terminal 102 owned by the debtor 12. Herein, if the user 11 does not request cash-less purchase, the service can be received by means of ordinary coins, bills, credit card, etc.

<Step 2>

The input section 2203 transfers the request of cash-less purchase of the user 11 to the controller 2201 together with the selection service, member ID and basic authentication password.

<Step 3>

The controller 2201 detects the cash-less purchase request from the user 11, and commands the communication means 204 to access to the accounting device 350.

<Step 4>

The communication means 204 sends, through the communication line 202, the facility ID, facility authentication password, and facility address for communication of the facility 200 to the accounting authentication control means 301 in the accounting device 350 by using the address for communication of the accounting device 350. Then the facility authentication and access permit of the service facility 200 are requested.

Herein, the facility ID and the facility authentication password are those noticed from the accounting service provider when the service provider owning the service facility 200 makes a service presentation contract with the accounting service provider operating the accounting device 350. The noticed facility ID and facility authentication password are stored in the DB 3320, in correspondence to the facility name of the service facility 200, facility ID, facility authentication password, facility address, selectable service, and other information.

When transmitting the facility ID and facility authentication password by using the communication line 202, the communication security may be assured by encrypting the information.

Incidentally, the address of the accounting device 350 on the information communication line 202, and the facility ID, facility authentication password, and facility address of the service facility 200 are stored in the communication means 204. In addition, the following may be also possible.

(1) The accounting device 350 address, facility ID, facility authentication password, and facility address are stored in the DB 210.

(2) When communicating with the accounting device 350, the controller 2201 reads out the accounting device 350 address, the facility ID, the facility authentication password, and the facility address from the facility control DB 210.

(3) The accounting device address, the facility ID, the facility authentication password, and the facility address are noticed to the communication means 204.

<Step 5>

The accounting authentication control means 301, receiving the facility ID, facility authentication password, and facility address, sends the facility ID, facility authentication password, and facility address to the facility authentication means 302, and requests facility authentication of the service facility corresponding to the facility ID.

<Step 6>

The authentication means 302, receiving the facility ID and facility authentication password from the control means 301, requests the facility authentication password for collation and facility address for collation corresponding to the facility ID received from the control means 301, to the facility DB 3320.

Herein, the facility authentication password for collation is the facility password corresponding to the facility ID stored in the facility DB 3320. The facility address for collation is the facility address corresponding to the facility ID stored in the facility DB 3320.

<Step 7>

The facility DB 3320 executes search of facility information by the key word of the requested facility ID. When the same facility ID is found, the facility authentication password for collation and facility address for collation corresponding to this facility ID are sent to the facility authentication means 302.

Herein, as a result of search, if the requested facility ID is not found, the DB 3320 informs the authentication means 302 that the facility ID is not found.

<Step 8>

The authentication means 302, when the facility authentication password for collation is returned from the DB 3320, compares the facility authentication password for collation with the facility authentication password sent from the facility 200. If they are matched, it is judged that the first step of facility authentication is established, and the process goes to step 9. If not matched, it is judged that the facility authentication is not established, and the process goes to step 10.

Herein, if the notice of absence of facility ID to be searched is noticed from the facility database 3320, the facility authentication means 302 judges that the facility authentication is not established, and goes to step 10.

<Step 9>

The authentication means 302 compares the facility address for collation returned from the DB 3320 and the facility address sent from the facility 200. If matched, the facility authentication is established, and if not matched, the facility authentication is not established.

<Step 10>

The authentication means 302 notices the judging result of facility authentication to the control means 301 together with the facility ID and facility address.

<Step 11>

The control means 301 determines whether or not to permit access of the service facility 200 on the basis of the authentication judging result received from the authentication means 302. The decision result is sent to the communication means 204 by using the facility address.

<Step 12>

Receiving the access permit decision result, the communication means 204 notices the decision result to the controller 2201.

<Step 13>

If the access is permitted, the controller 2201 requests the accounting amount corresponding to the selection service entered by the user 11, for example, purchase of tea, to the DB 210, and goes to step 14.

If the access is not permitted, the controller 2201 reports the user 11 that the commodity cannot be purchased by the accounting system, through the output section 2202. Urging purchase of commodity by ordinary coins, bills or credit card, the operation of the accounting system is terminated.

<Step 14>

The DB 210 executes search of commodity information by the key word of the requested selection service. As a result, when the same selection service is found, the accounting amount corresponding to this selection service is sent to the controller 2201.

<Step 15>

Receiving the accounting amount, the controller 2201 informs the communication means 204 of the member ID, basic authentication password, and selection service entered by the user 11, and the accounting amount. An instruction for transmission of accounting request is issued to the accounting device 350.

<Step 16>

The communication means 204, receiving the accounting request transmission instruction from the controller 2201, sends the member ID, basic authentication password, selection service, and accounting amount to the control means 301 through the communication line 202. Consequently, execution of the individual authentication of the user 11 and the accounting service is requested.

In this case, when communicating the member ID, basic authentication password, selection service, and accounting amount by using the communication line 202, the communication security may be assured by encrypting such information.

<Step 17>

Receiving the execution request of individual authentication and accounting service, the control means 301 sends the member ID and basic authentication password to the authentication means 303. The individual authentication of the user 11 corresponding to the member ID is requested.

<Step 18>

The authentication means 303, receiving the member ID and basic authentication password from the control means 301, requests the basic authentication password for collation corresponding to the received member ID to the DB 310.

Herein, the basic authentication password for collation shows the basic authentication password corresponding to the member ID stored in the DB 310.

<Step 19>

The DB 310 executes search of member user information in the database, by the keyword of the requested member ID. When the same member ID is found, the basic authentication password for collation corresponding to this member ID is sent to the authentication means 303.

Herein, as a result of search, if the requested member ID cannot be found, the DB 310 informs the authentication means 303 that the member ID is not found.

<Step 20>

When the basic authentication password for collation is returned from the DB 310, the basic authentication means 303 compares the basic authentication password for collation and the basic authentication password. If they are matched, it is judged that the basic authentication is established, and if not matched, it is judged that the basic authentication is not established.

If it is noticed from the DB 310 that the member ID to be searched is not found, the authentication means 303 judges that the basic authentication is not established.

<Step 21>

The authentication means 303 notices the judging result of basic authentication to the accounting authentication control means 301 together with the member ID.

<Step 22>

The authentication control means 301, when the authentication result sent from the authentication means 303 is establishment of basic authentication, sends the member ID, facility name, accounting amount, and selection service to the authentication means 305, and requests authentication via mobile communication.

Herein, if the result of basic authentication sent from the authentication means 303 is failure in establishment of basic authentication, the control means 301 stops individual authentication and accounting process, and skips to step 48.

<Step 23>

The authentication means 305, receiving the member ID from the control means 301, requests the authentication password via mobile communication for collation and mobile communication terminal call number corresponding to the member ID to the DB 310.

Herein, the authentication password via mobile communication for collation is the authentication password via mobile communication corresponding to the member ID stored in the DB 310.

<Step 24>

The DB 310 execute search of member user information in the database, by the keyword of the requested member ID. When the same member ID is found, the authentication password via mobile communication for collation and mobile communication terminal call number corresponding to the member ID are sent to the authentication means 305.

As a result of search, however, if the requested member ID is not found, the DB 310 informs the mobile communication authentication means 305 that the member ID number is not present.

<Step 25>

The mobile communication authentication means 305, when the authentication password via mobile communication for collation and mobile communication terminal call number are returned from the DB 310, requests line connection to the terminal 102 by using the mobile communication terminal call number to the provider 400. If the mobile communication authentication means 305 receives the notice that the requested member ID is not found, from the DB 310, the mobile communication means 322 judges that the basic authentication is not established, and skips to step 38.

The communication line used in transmission of line connection request from the authentication means 305 to the provider 400 may be either the exclusive line or the public line such as telephone network.

<Step 26> to <Step 29>

The operation at step 26, step 27, step 28, and step 29 differs with the line connection method of the provider 400. A method of connection to a general line of cellular phone is explained below.

<Step 26>

The provider 400 requests line connection to the terminal 102 by using the communication line 201. Herein, if the terminal 102 is used in other communication and the line cannot be connected, the provider 400 judges that the line connection is failure, and advances to step 30.

<Step 27>

The terminal 102, receiving the line connection request from the provider 400, informs the debtor 12 of reception of line connection request by means of beeper or vibrator.

<Step 28>

The debtor 12 pushes a response button provided in the terminal 102, and replies to the line connection request.

<Step 29>

The terminal 102 notices the response from the debtor 12 to the provider 400 by using the mobile communication line 201, and sets a line in the mobile communication line 201.

<Step 30>

The provider 400 informs the mobile communication authentication means 305 of the line connection result. Herein, if the line connection result sent from the provider 400 is a line connection failure, the authentication means 305 judges that the authentication via mobile communication has been a failure, and skips to step 38.

<Step 31> to <Step 33>

When the line connection result from the provider 400 is successful, the authentication means 305 presents the member ID, facility name, accounting amount, and selection service to the debtor 12 by using the communication line 201. Then input of the individual authentication of the user 11, and the authentication password via mobile communication corresponding to the permission confirmation to the service reception is requested to the debtor 12.

Herein, the authentication password via mobile communication is the information noticed from the service account provider when the debtor 12 makes an accounting service presentation contract with the accounting service provider. The noticed authentication password via mobile communication" is stored in the DB 310 in correspondence to the name of the debtor 12 and the mobile terminal call number of the terminal 102 owned by the debtor 12.

<Step 34> to <Step 36>

When the debtor 12 enters the authentication password via mobile communication in the terminal 102, the terminal 102 sends the authentication password via mobile communication to the mobile communication authentication means 305 by using the mobile communication line 201.

<Step 37>

When the authentication password via mobile communication is returned, the authentication means 305 compares the authentication password via mobile communication for collation and the authentication password via mobile communication. If matched, it is judged that the authentication via mobile communication is established, and if not matched, it is judged that the authentication via mobile communication is not established.

<Step 38>

The authentication means 305 notices the authentication result of the authentication via mobile communication to the control means 301 together with the member ID.

<Step 39>

The control means 301, when the authentication result sent from the authentication means 305 is successful, judges that the individual authentication of the user 11 is successful and that the accounting permission of the debtor 12 is received.

If the authentication result is failure of authentication via mobile communication, the control means 301 stops the accounting process, and advances to step 48.

<Step 40>

The authentication means 301, receiving the accounting permission from the debtor 12, sends the facility name, accounting amount, member ID and selection service to the accounting means 304. Then the accounting process is requested.

<Step 41>

The accounting means 304 requests the member usable amount corresponding to the member ID received from the control means 301.

Herein, the member usable amount is the amount corresponding to the member ID stored in the DB 310.

<Step 42>

The DB 310 executes search of the member user information in the database by the keyword of the requested member ID. When the same member ID is found, the member usable amount corresponding to this member ID is sent to the accounting means 304.

<Step 43>

The accounting means 304, when the member usable amount is returned from the DB 310, compares the accounting amount and the member usable amount. For example, when the member usable amount is larger than or same as the accounting amount, or when the member usable amount is lager than or same as the sum of the accounting amount and the accounting commission, the accounting means 304 judges that the accounting is possible, and goes to step 44 and starts the accounting process.

If, however, the member usable amount is smaller than the accounting amount, or if the member usable amount is smaller than the sum of the accounting amount and the accounting commission, the accounting means 304 judges that the accounting is not possible, and stops the accounting process and goes to step 46.

<Step 44>

The accounting means 304 requests the DB 310 to rewrite the member usable amount after accounting process and overwrite the accounting record about the item of member usable amount and item of accounting record corresponding to the member ID received from the control means 301. Herein, the member usable amount after accounting process is the balance of subtracting the accounting amount from the member usable amount, or the balance of subtracting the accounting amount and commission from the member usable amount.

<Step 45>

The DB 310 executes search of member user information in the database by the keyword of the requested member ID. When the same member ID is found, it executes to rewrite the member usable amount after accounting process and overwrite the accounting record about the item of member usable amount and item of accounting record corresponding to this member ID. The results of rewriting and overwriting are sent to the accounting processing means 304.

The accounting of the debtor 12 is settled by deducting according to the accounting record recorded in the DB 310 by the accounting device 350, from the bank account designated by the debtor 12 when signing the accounting service presentation contract with the accounting service provider operating the accounting device 350. The timing of this settlement may be either every specific period or in real time. If the accounting device 350 itself operated by the accounting service provider has the settling function, the DB 310 may be designated as the settling account, and the member usable amount for the member ID may be the balance of the settling account. In this case, the accounting process at step 44 and step 45 functions as the settling process.

The accounting settlement between the service provider operating the service facility 200 and the accounting device 350 is executed by the accounting device 350 according to the accounting record recorded in the DB 310, in the bank account designated in the accounting service presentation contract between the service provider and the accounting service provider operating the accounting device 350. It is possible to remit in every specific period or in real time.

Or if the accounting device 350 itself operated by the accounting service provider has the settling function, an item of facility fee amount may be set as the settling account of each facility corresponding to the facility ID in the DB 3320, and the accounting amount to the debtor 12 about the service facility 200 may be settled in every specific period, or the data may be rewritten in real time.

<Step 46>

The accounting processing means 301 receives the rewriting result from the DB 310, and, when normally written, judges that the accounting process is normally terminated. If writing is abnormal or the accounting process is judged impossible at step 43, it is judged that the accounting process is terminated abnormally.

<Step 47>

The accounting means 304 sends the judging result of accounting process to the control means 301.

Herein, receiving the judging result of accounting process, the accounting authentication control means 301 executes step 48 to step 54, and step 55 to step 58 in parallel operation.

<Step 48>

The control means 301 receiving the judging result of accounting process from the accounting means 304 transmits the accounting process result to the communication means 204 by using the facility address.

<Step 49>

The communication means 204 receiving the accounting process result from the control means 301 notices the accounting process result to the controller 2201.

<Step 50>

The controller 2201 requests the output section 2202 to show the service supply permission on the basis of the accounting process result and the accounting amount to the user 11.

<Step 51, Step 52>

The output section 2202, according to the request received from the controller 2201, shows the normal end display of accounting process and the accounting amount display, when the accounting process result is normal end of accounting process, to the user 11, and advances to step 53.

If the accounting process result is abnormal end of accounting process, the output section 2202 reports the user 11 that the commodity cannot be purchased by the accounting system using the individual authentication system, and urges to purchase the commodity by ordinary coins, bills or credit card, and terminates the operation of the accounting system.

<Step 53>

The controller 2201, when the accounting process result is normal end of accounting, commands the commodity sender 205 to send out the commodity desired by the user 11.

<Step 54>

The commodity sender 205 sends out the commodity desired by the user 11, and terminates the operation of the accounting system by applying the individual authentication system.

<Step 55>

The accounting authentication control means 301 receiving the judging result of accounting process from the accounting processing means 304 requests the authentication means 305 to notice the accounting process result, facility name, and accounting amount to the debtor 12.

<Step 56> to <Step 58>

The authentication means 305, using the communication line 201, sends the accounting process result, facility name, and accounting amount to the debtor 12.

By using the accounting system for the service supply by applying the individual authentication system of the invention, for example, the following transaction is possible.

The call number of the mobile terminal held by the father is registered as the object of authentication through the authentication via mobile communication, and only the father knows all member ID, corresponding basic authentication password, and authentication password via mobile communication. The child knows only one member ID and corresponding basic authentication password. Then, the child can enjoy the service of the service facility without using card or cash. At this time, the father, wherever he is, can check in real time that who is requesting how much service in which service facility, so that permission or rejection of accounting can be decided.

Seventh Embodiment

Figure 19:
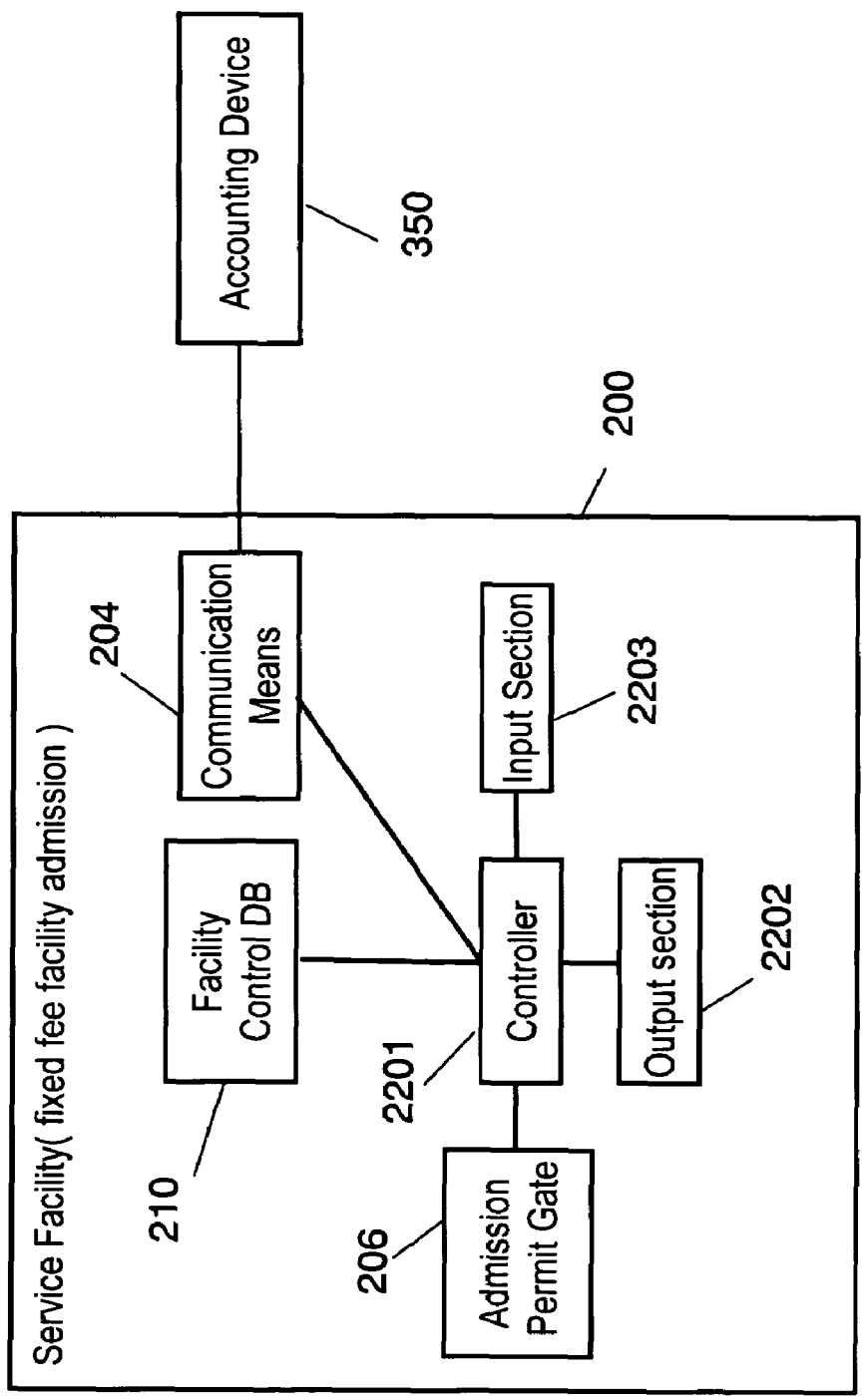
FIG. 19 is a conceptual diagram showing a structure of a service facility of the accounting system applying the individual authentication system in the seventh embodiment of the invention.

FIG. 19 is a conceptual diagram showing a structure of a service facility 200 for fee collection assuming a fixed fee facility or fixed fee parking lot in a seventh embodiment of the invention. The outline of configuration of the accounting system of the fixed fee facility or fixed fee parking lot, the structure of the accounting device, the facility database in the accounting device, and the member database are same as in the sixth embodiment shown in FIG. 11, FIG. 12, FIG. 13, and FIG. 14.

This embodiment differs from the sixth embodiment in the composition and configuration of the service facility 200 and the service supply method to the user 11.

The fee collecting service facility 200 shown in FIG. 19 comprises (1) an input section 2203 composed of keyboard, buttons, touch panel or the like for taking in the information from the user 11, (2) an output section 2202 such as liquid crystal display, LED display, or cathode-ray tube, for displaying the information of the service facility 200 to the user, (3) an admission permit gate 206 for permitting admission into the facility only to the user 11 having paid the due fee, (4) a facility control DB 210 for storing service information that can be presented by the service facility 200, (5) communication means 204 for communicating with the registered accounting device 350 by using an open information communication line 202, and (6) a controller 2201 for controlling the output section 2202, input section 2203, communication means 204, and admission permit gate 206.

FIG. 20 is a diagram showing an example of service information necessary for realizing the accounting system of the service facility 200 assuming a fixed fee facility or fixed fee parking lot in the embodiment. The service information is preliminarily registered in the DB 210. FIG. 20 shows an example of storage of four types of service information. The service information consists of service name and accounting amount.

Figure 21:
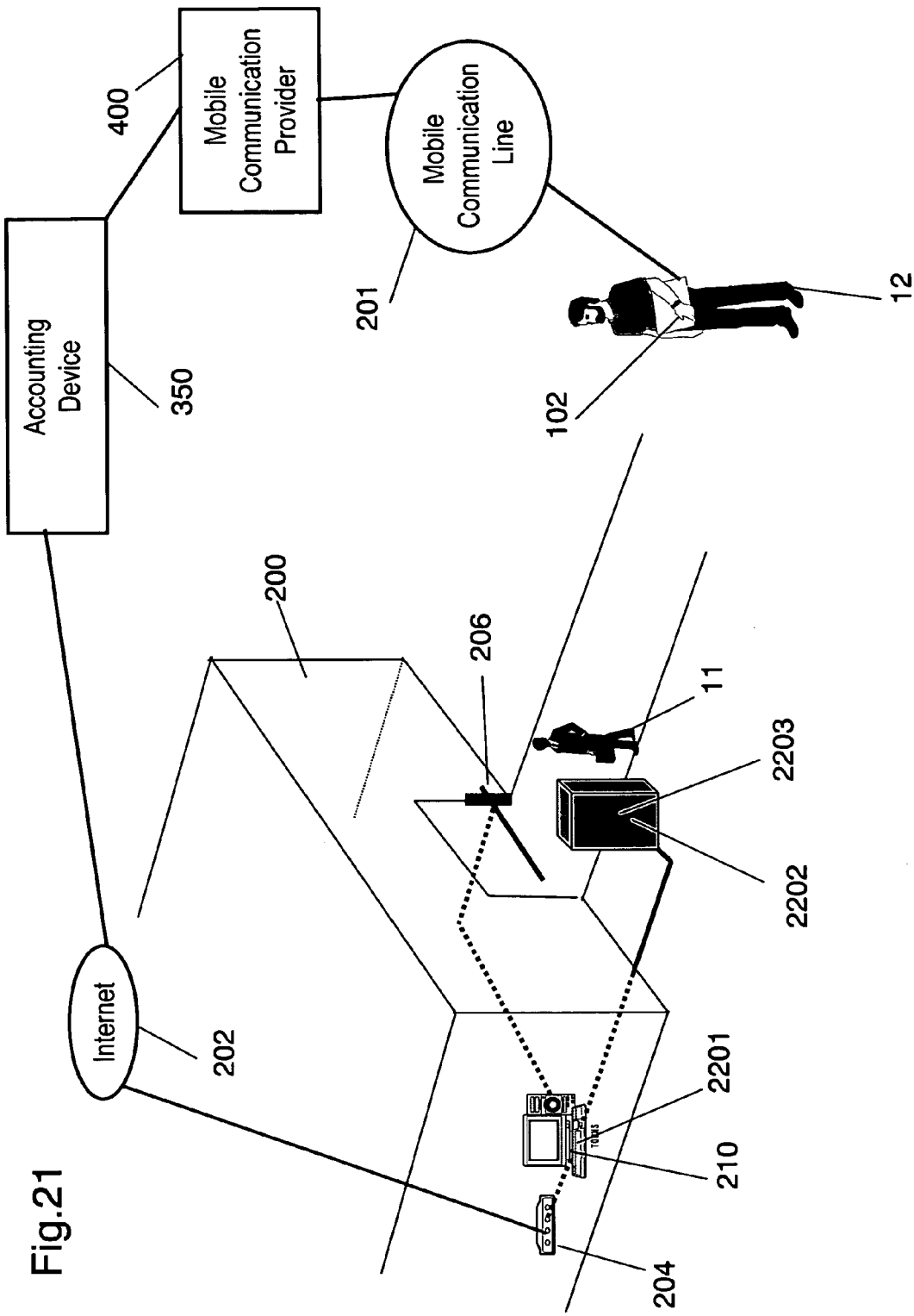
FIG. 21 is a diagram showing an example of physical configuration of the accounting system applying the individual authentication system in the seventh embodiment of the invention.

FIG. 21 is a diagram showing an example of physical configuration of the accounting system of the service facility 200 assuming a fixed fee facility or fixed fee parking lot in the embodiment. In FIG. 21, the facility input section 2203 and output section 2202 are installed before the service facility, the facility controller 2201, facility control DB 210, and communication means 204 are installed inside the facility, and the admission permit gate 206 is installed at the entrance of the facility.

FIG. 21 shows (1) the user 11 wishing to enter the amusement facility, (2) the accounting device 350 connected to the service facility 200 through an open information communication line 202, for executing individual authentication and accounting for request from the user 11 for cash-less admission into the facility, (3) the debtor 12 for proving authentication of the user 11 wishing to enter the facility, and deciding approval or rejection of accounting for the admission, (4) the mobile terminal 102 for displaying the authentication proving request and service permission from the accounting device 350 to the debtor 12 for making an input whenever and wherever, (5) the mobile communication network 201 for connecting between the accounting device 350 and mobile terminal 102 whenever and wherever, and (6) the mobile communication provider 400 supervising the mobile communication network.

Herein, the user 11 and the debtor 12 are shown as different people, but the user and the debtor may be also a same person.

Figure 22:
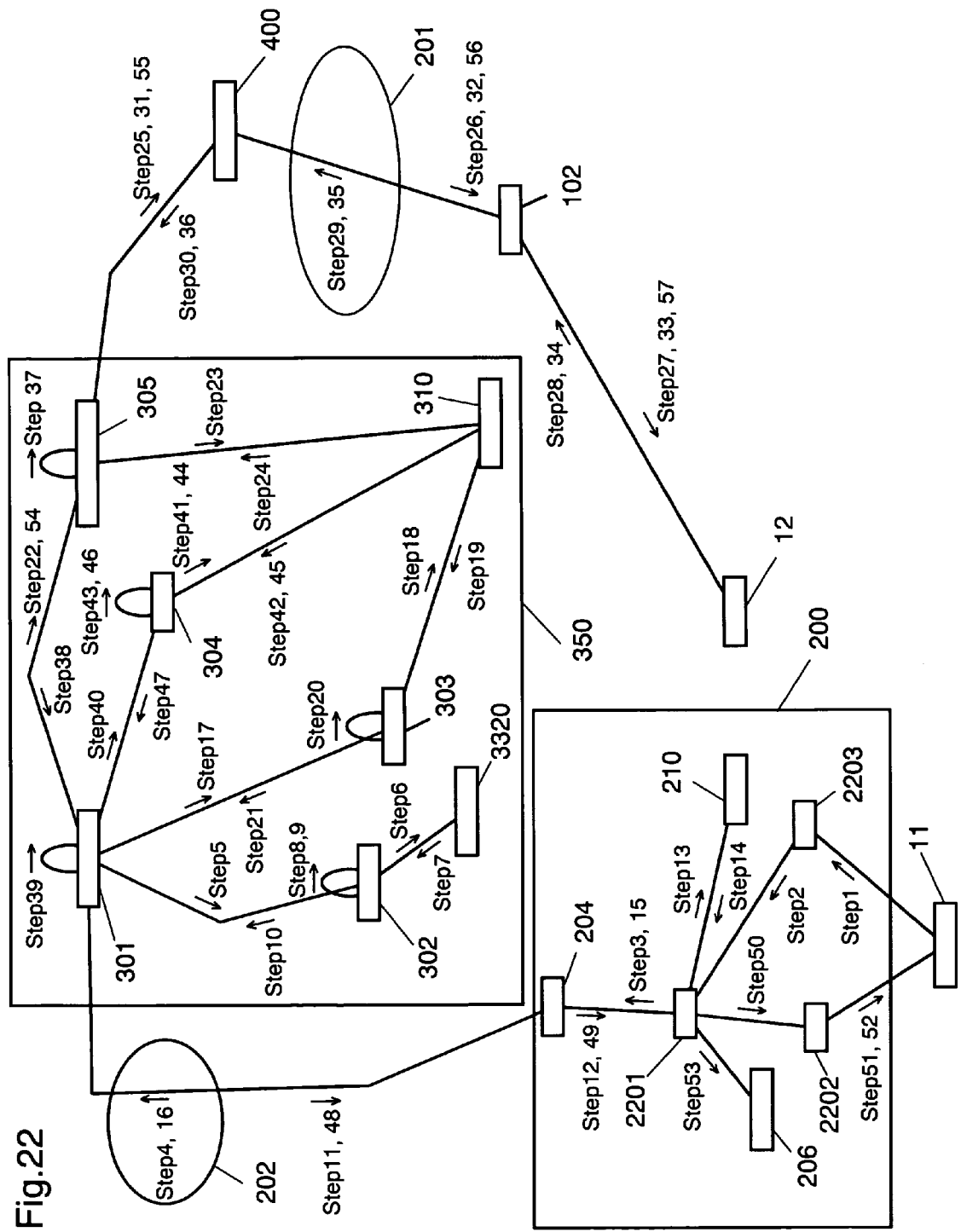
FIG. 22 is a collaboration diagram showing the authentication and accounting procedure of the accounting system applying the individual authentication system in the seventh embodiment of the invention.

FIG. 22 is a collaboration diagram showing the authentication and accounting procedure of the accounting system of the service facility 200 assuming a fixed fee facility or fixed fee parking lot in the embodiment.

In FIG. 22, numerals of step 1 to step 57 show the sequence of the processing procedure. The operation of the accounting system at the service facility 200 is explained below while referring to FIG. 22.

<Step 1> to <Step 49>

The individual authentication procedure and accounting process procedure necessary for executing payment of admission fee at the service facility 200 such as the facility shown in FIG. 21 is same as in the procedure of step 1 to step 49 in the sixth embodiment.

<Step 50>

The controller 2201 requests the output section 2202 to send the approval or rejection of service supply on the basis of the accounting process result and the accounting amount to the user 11.

<Step 51, Step 52>

The output section 2202, according to the request from the controller 2201, shows the normal end of accounting process and accounting amount to the user 11 when the accounting process result is normal end of accounting process, and goes to step 53.

If the accounting process result is abnormal end of accounting process, the output section 2202 reports the user 11 that admission by the accounting system is not possible. It urges payment of admission fee by ordinary coins, bills or credit card, and terminates the accounting system.

<Step 53>

The controller 2201, when the accounting process result is normal end of accounting, issues an admission permit command for the user 11 to the admission permit gate 206.

<Step 54>

Receiving the accounting process judging result from the processing means 304, the control means 301 requests the authentication means 305 to notice the accounting process result, facility name, and accounting amount to the debtor 12.

<Step 56> to <Step 58>

The authentication means 305 presents the accounting process result, facility name, and accounting amount to the debtor 12, by using the line set in the communication line 201.

Eighth Embodiment

The outline of configuration of the accounting system of the hourly fee facility or parking lot by applying the individual authentication system in this embodiment, the structure of the accounting device, the facility database in the accounting device, and the member database are same as in the sixth embodiment shown in FIG. 11, FIG. 12, FIG. 13, and FIG. 14.

This embodiment differs from the sixth embodiment in the composition and configuration of the service facility 200 in FIG. 11, and the operating procedure of the accounting system. In particular, in the sixth embodiment and seventh embodiment, a series of accounting transaction is terminated by one operation, whereas in the hourly accounting system of this embodiment, the accounting action is executed in two transactions. that is, one is entrance transaction of individual authentication and accounting approval check action upon entry the other is exit transaction of individual authentication and accounting action upon departure.

Figure 23:
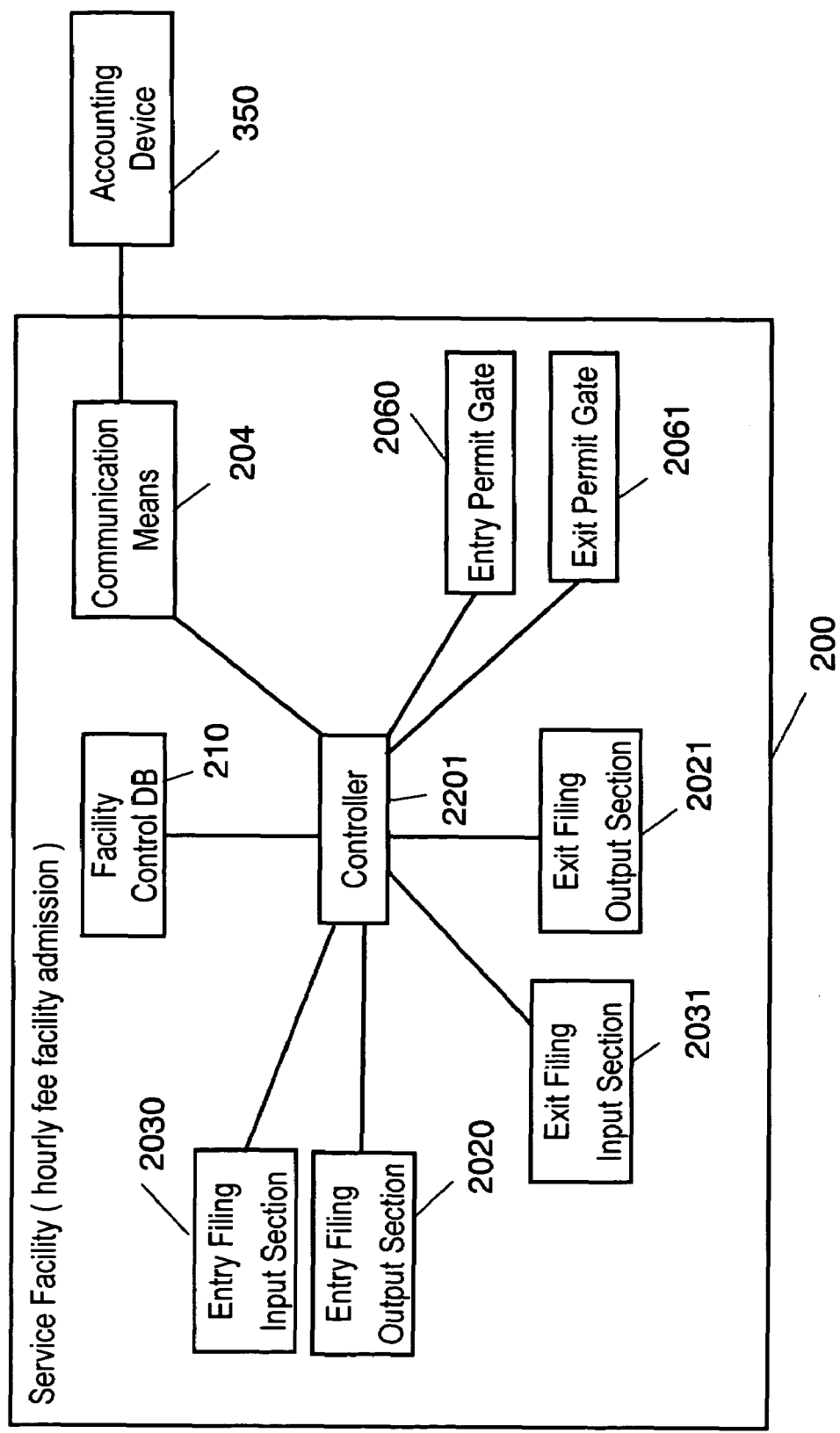
FIG. 23 is a conceptual diagram showing a structure of a service facility of the accounting system applying the individual authentication system in the eighth embodiment of the invention.

FIG. 23 is a conceptual diagram showing a structure of the service facility 200 assuming an hourly fee facility or parking lot according to the eighth embodiment of the invention. The service facility in this embodiment comprises, as shown in FIG. 23, (1) an entry filing input section 2030 and a departure filing input section 2031, each composed of keyboard, buttons, touch panel or the like, for taking in the information from the user 11 when entering and leaving, (2) an entry filing output section 2020 and a departure filing output section 2021 such as liquid crystal display, LED display, or cathode-ray tube, for displaying the information of the service facility 200 to the user when entering or leaving, (3) an admission permit gate 2060 for permitting admission into the facility only to the creditable user 11, (4) a departure permit gate 2061 for permitting to leave the facility only to the creditable user 11, (5) a facility control DB 210 for storing service information that can be presented by the service facility 200, (6) communication means 204 for realizing communication with the accounting device 350 by using an open information communication line 202, and (7) a controller 2201 for controlling the entry filing output section 2020, entry filing input section 2030, departure filing output section 2021, departure filing input section 2031, communication means 204, and admission permit gate 2060, and departure permit gate 2061.

FIG. 24 is a diagram showing an example of service information necessary for realizing the accounting system of the service facility 200 assuming an hourly fee facility or parking lot in the embodiment. The service information is preliminarily registered in the DB 210. FIG. 24 shows an example of storage of service information of two people or two cars. The service information consists of the member ID corresponding to each person admitted (each car admitted), and the admission time, accounting amount at the present time, and accounting information corresponding to the member ID.

Figure 25:
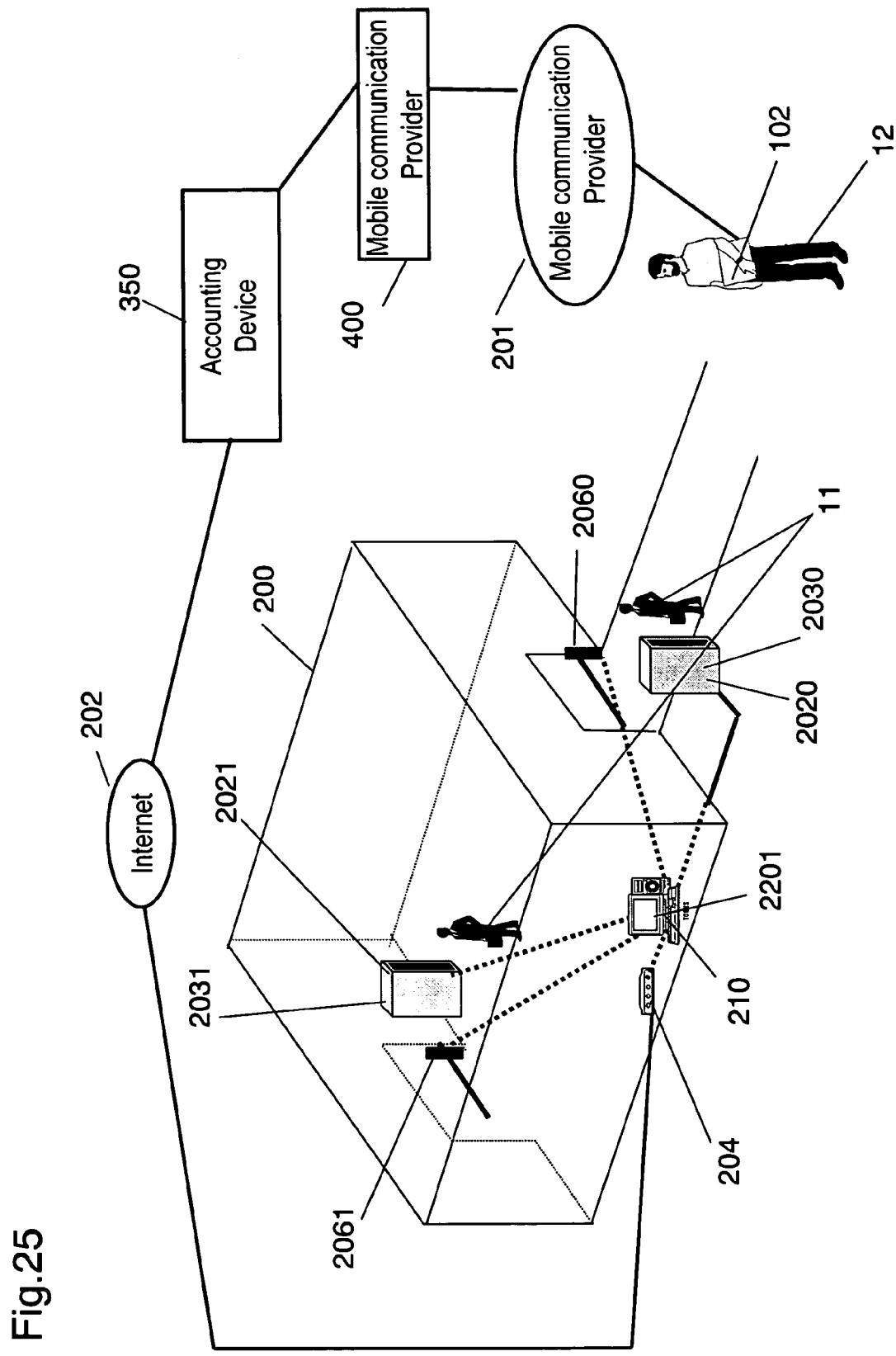
FIG. 25 is a diagram showing an example of physical configuration of the accounting system applying the individual authentication system in the eighth embodiment of the invention.

FIG. 25 is a diagram showing an example of physical configuration of the accounting system of the service facility 200 assuming an hourly fee facility or parking lot in the embodiment.

In FIG. 25, the entry filing input section 2030 and entry filing output section 2020 are installed before the facility entrance, the admission permit gate 2060 at the facility entrance, and the departure filing input section 2031 and departure filing output section 2021 before the facility exit. The controller 2201, DB 210, and communication means 204 are installed in the facility. In FIG. 25, same parts as in FIG. 21 are identified with same reference numerals.

Figure 26:
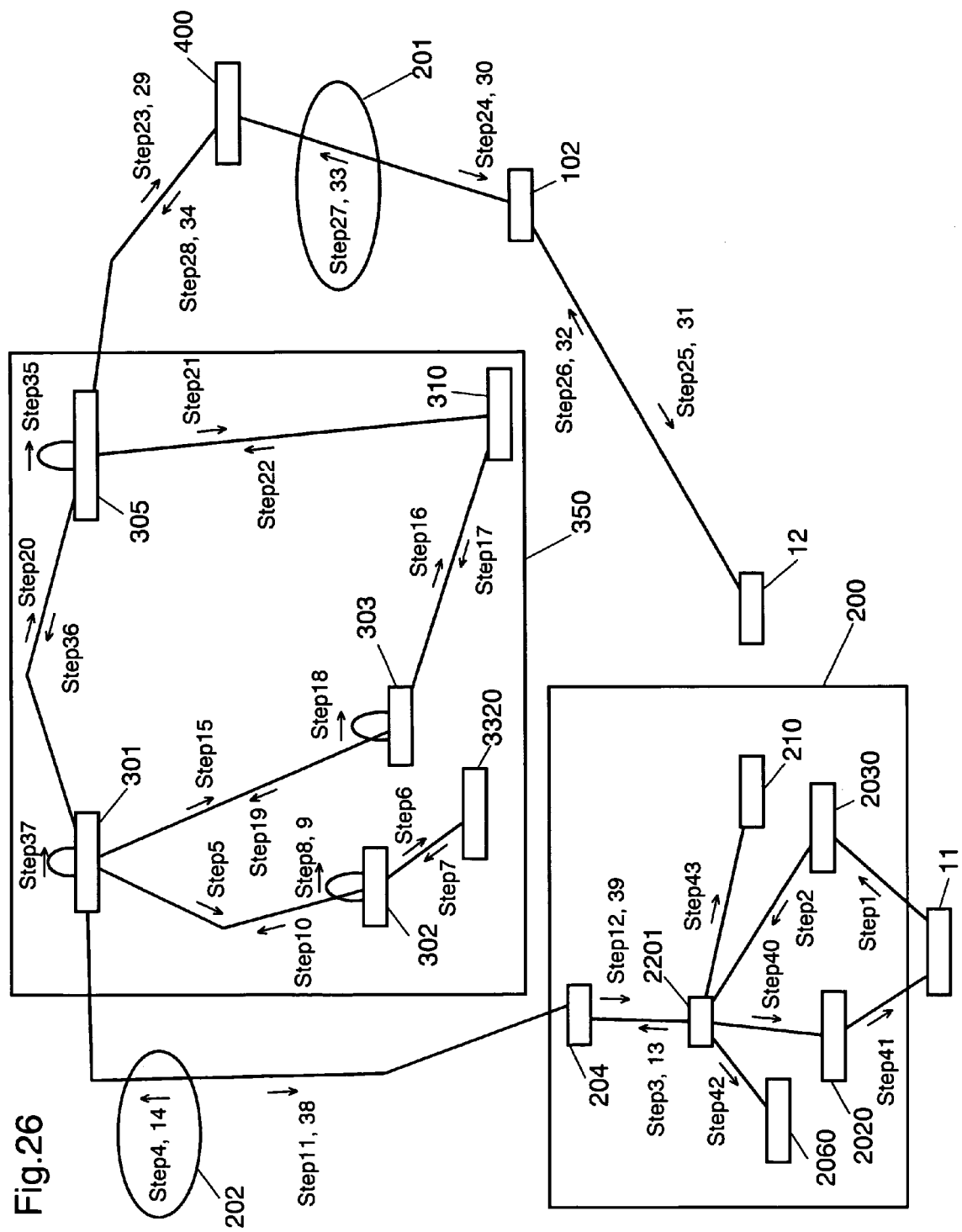
FIG. 26 is a collaboration diagram showing the authentication procedure when entering of the accounting system applying the individual authentication system in the eighth embodiment of the invention.

FIG. 26 is a collaboration diagram showing the entrance transaction (individual authentication and accounting approval) of the accounting system of the service facility 200 assuming an hourly fee facility or parking lot in the embodiment.

In FIG. 26, numerals of step 1 to step 43 show the sequence of the processing procedure.

The operation of the accounting system of the facility service 200 at the hourly fee facility or parking lot applying the individual authentication system is explained below while referring to FIG. 26.

<Step 1> to <Step 12>

The procedure from the service request by the user 11 until reception of service approval or rejection to the accounting device 350 of the service facility 200 is same as in the procedure of step 1 to step 12 in the sixth embodiment.

<Step 13>

If the access permission is approved from the communication means 204, the controller 2201 informs the communication means 204 of the member ID and basic authentication password entered by the user 11, and sends a command for accounting approval inquiry request transmission to the accounting device 350.

If the access permission is rejected, the controller 2201 informs the user 11 through the output section 2202 that the accounting process by the accounting system by applying the individual authentication system cannot be applied. It urges an ordinary admission by buying a ticket, and terminates the operation of the accounting system.

<Step 14>

The communication means 204, when receiving the accounting request transmission command from the controller 2201, sends the member ID and basic authentication password to the accounting authentication control means 301 in the accounting device 350 by using the communication line 2202, and requests execution of individual authentication of the user 11 and the accounting approval or rejection inquiry. Herein, when sending the member ID and basic authentication password by using the communication line 202, the communication security may be assured by encrypting the information.

<Step 15>

The accounting authentication control means 301, receiving the request of execution of individual authentication of the user 11 and the accounting approval or rejection inquiry, sends the member ID and basic authentication password to the basic authentication means 303, and requests the individual authentication of the user 11 corresponding to the member ID.

<Step 16> to <Step 18>

The basic authentication procedure by the basic authentication means 303 is same as in the procedure of step 18 to step 20 in the sixth embodiment.

<Step 19>

The authentication means 303 notices the judging result of basic authentication to the control means 301 together with the member ID.

<Step 20>

The control means 301, when the authentication result sent from the authentication means 303 is establishment of basic authentication, sends the member ID and facility name to the mobile communication authentication means 305, and requests authentication via mobile communication.

Herein, if the result of basic authentication sent from the authentication means 303 is failure of basic authentication, the control means 301 stops individual authentication, and goes to step 37.

<Step 21> to <Step 35>

The authentication procedure by the authentication means 305 is same as in the procedure of step 23 to step 37 in the sixth embodiment.

<Step 36>

The authentication means 305 notices the authentication result of authentication via communication means to the control means 301 together with the member ID.

<Step 37>

The control means 301, when the authentication result sent from the authentication means 305 is successful, judges that the individual authentication of the user 11 is successful and that the accounting of the debtor 12 is permitted.

If the authentication result is unsuccessful, the control means 301 judges that the individual authentication is failure and that the accounting is not permitted.

<Step 38>

The control means 301 sends the accounting approval or rejection result to the communication means 204 by using the facility address.

<Step 39>

The communication means 204, receiving the accounting approval or rejection result, notices the accounting approval or rejection result to the controller 2201.

<Step 40>

The controller 2201 requests the output section 2020 to show the service supply approval or rejection to the user 11 on the basis of the accounting approval or rejection result.

<Step 41>

The output section 2020, according to the request received from the controller 2201, shows the accounting approval display to the user 11 if the accounting is approved, and goes to step 42.

If the accounting is rejected, the output section 2020 informs the user 11 that the accounting cannot be processed by the accounting system. It urges an ordinary admission by buying a ticket, and terminates the operation of the accounting system.

<Step 42>

The controller 2201, when the accounting is permitted, instructs an admission permit to the user 11 to the gate 2060.

<Step 43>

The controller 2201, when the accounting is permitted, records the admission time of the user 11 together with the member ID in the DB 210.

Figure 27:
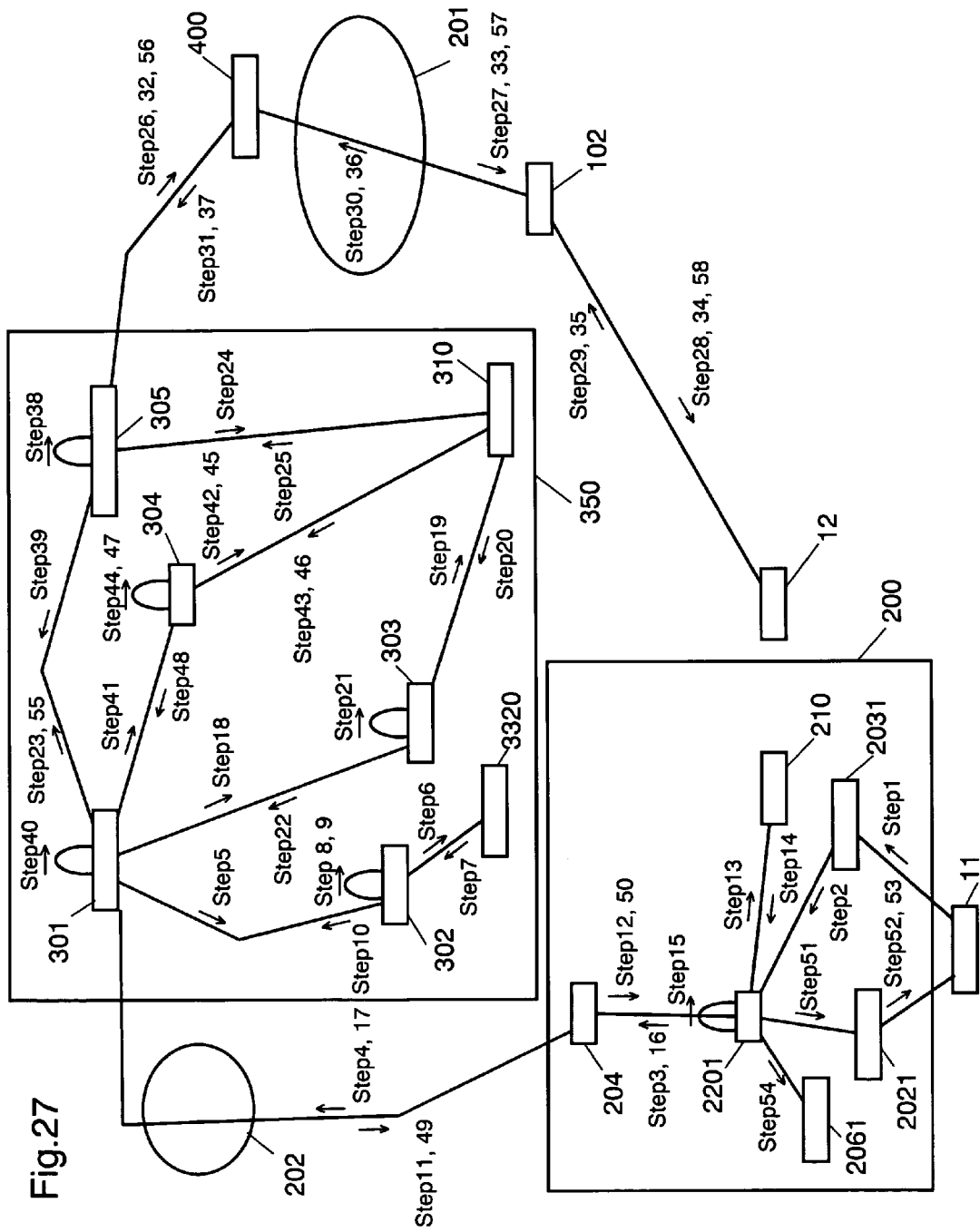
FIG. 27 is a collaboration diagram showing the accounting and authentication procedure when leaving of the accounting system applying the individual authentication system in the eighth embodiment of the invention.

Referring now to FIG. 27, the exit transaction is explained.

FIG. 27 is a collaboration diagram showing the exit transaction (individual authentication and accounting process) of the accounting system of the service facility 200 assuming an hourly fee facility or parking lot in the embodiment. Numerals of step 1 to step 58 show the sequence of the processing procedure. The operation of the accounting system of the service facility 200 at an hourly fee facility or parking lot applying the individual authentication system is explained below while referring to FIG. 27.

<Step 1> to <Step 12>

The procedure of facility authentication from the leave request input by the user 11 till reception of access approval or rejection in the accounting device 350 of the service facility 200 is same as in the procedure of step 1 to step 12 in the sixth embodiment.

<Step 13>

When the access is approved, the controller 2201 requests the admission time corresponding to the member ID of the user 11 to the DB 210, and goes to step 14.

If the access is rejected, the controller 2201 tells the user 11, through the output section 2202, that the fee of using the facility cannot be paid by the accounting system, and reports the amount to be paid. It urges payment of fee by ordinary coins, bills or credit card, and terminates the operation of the accounting system.

<Step 14>

The DB 210 executes search of service information by the key word of the requested member ID. When the same member ID is found, the admission time corresponding to this member ID is sent to the controller 2201.

<Step 15>

The controller 2201, when receiving the admission time, calculates the facility using fee (accounting amount) of the user by the difference from the present time.

<Step 16> to <Step 50>

The individual authentication procedure and accounting processing procedure for service selection at the service facility of the user 11, and the payment of the fee for using the facility at the service facility 200 are same as in the procedure of step 15 to step 49 in the sixth embodiment.

<Step 51>

The controller 2201 requests the output section 2021 to transmit the service supply approval or rejection on the basis of the accounting process result and the accounting amount to the user 11.

<Step 52, Step 53>

The output section 2021, according to the request received from the controller 2201, shows the normal end display of accounting process and the accounting amount display to the user 11 when the accounting process is terminated normally, and goes to step 54.

If the accounting process result is abnormal end, the output section 2021 informs the user 11 that the fee of using the facility cannot be paid by the accounting system. It urges payment of fee by ordinary coins, bills or credit card, and terminates the operation of the accounting system.

<Step 54>

The controller 2201, when the accounting process result is normal end, instructs the exit permit of the user 11 to the gate 2061.

<Step 55>

The control means 301, receiving the accounting process judging result from the processing means 304, requests the authentication means 305 to notice the accounting process result, facility name, and accounting amount to the debtor 12.

<Step 56> to <Step 58>

The authentication means 305 presents the accounting process result, facility name, and accounting amount to the debtor 12 by the communication line 201.

Ninth Embodiment

The outline of the structure of the accounting system such as automatic vending machine by applying the individual authentication system shown in this embodiment is same as in the sixth embodiment in FIG. 11. The structure of the service facility 200, the facility control DB in the service facility 200, and the physical configuration of the accounting system are also same as in the sixth embodiment shown in FIG. 15, FIG. 16, and FIG. 17.

This embodiment differs from the sixth embodiment in the configuration of the accounting device 350 and the method of presentation of service to the user 11 as shown in FIG. 11.

Figure 28:
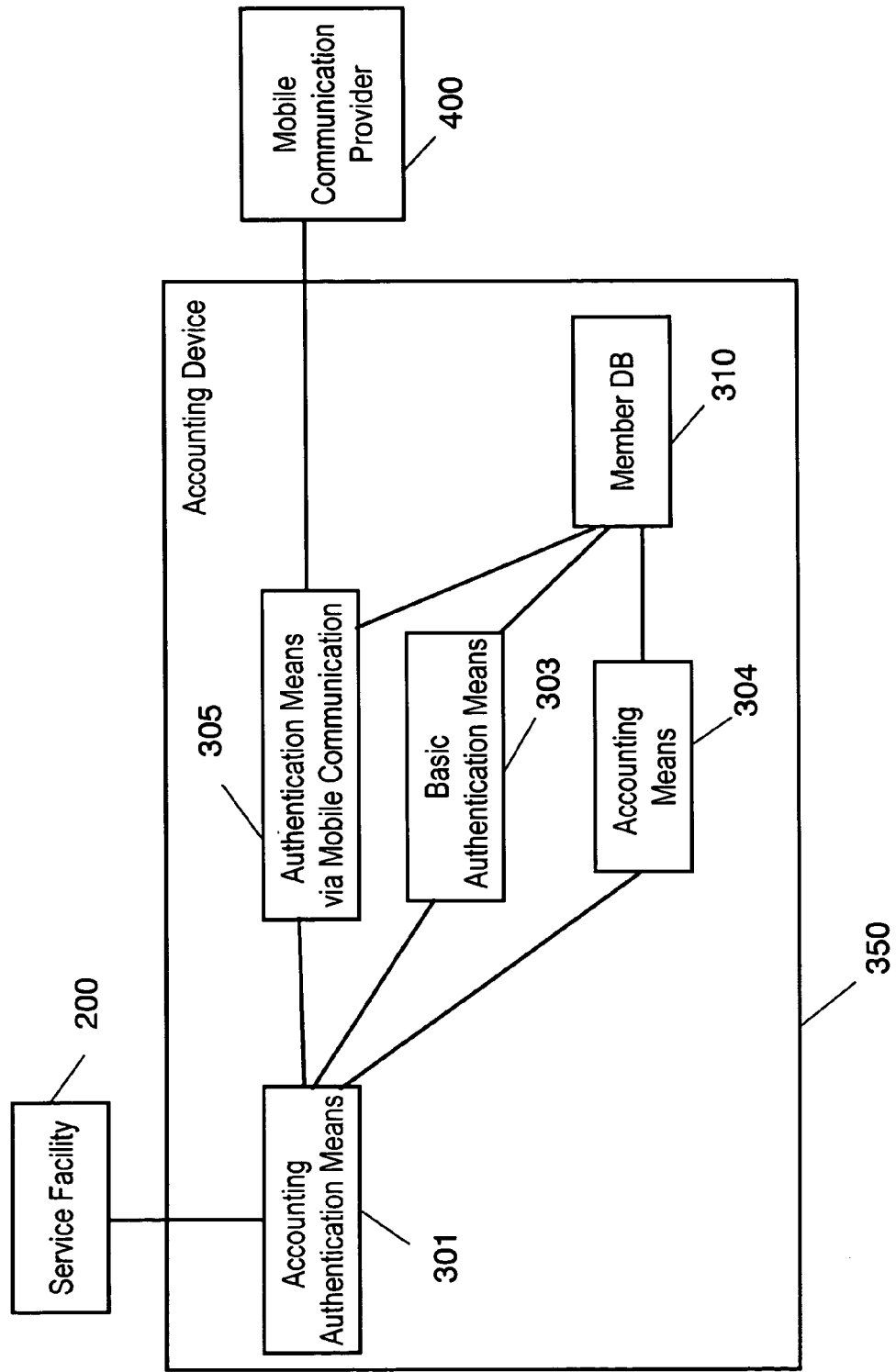
FIG. 28 is a conceptual diagram showing a structure of an accounting apparatus of the accounting system applying the individual authentication system in the ninth embodiment of the invention.

FIG. 28 is a conceptual diagram showing a structure of the accounting device 350 in the embodiment. As shown in FIG. 28, the accounting device 350 comprises (1) a member database (DB) 310 storing member user information of members preliminarily registered as the user 11 and debtor 12, (2) basic authentication means 303 for authenticating and judging if the user 11 requesting service to the service facility 200 is the official member or not by using an open information communication line 202, (3) mobile communication authentication means 305 of judging approval or rejection of service supply to the user 11 and authentication by using the mobile communication terminal owned by the debtor 12 corresponding to the user 11, (4) accounting means 304 for executing the accounting settlement and remission of the debtor 12 on the basis of the authentication result of the basic authentication means 303 and mobile communication authentication means 305, and (5) accounting authentication means 301 for executing judgement of individual authentication and accounting by comprehensively managing the facility basic authentication means 303, accounting means 304, and mobile communication authentication means 305.

FIG. 29 is a diagram showing an example of user member information necessary for realizing the accounting system of the service facility 200 of automatic vending machine by applying the individual authentication system shown in the embodiment. The member user information is preliminarily registered in the DB 310. FIG. 29 shows an example of storage of user information of two members. The member information consists of the member's name, at least one member ID number used by the user 11 when authenticating through the communication line 202, basic authentication password corresponding to the member ID number, one mobile communication terminal call number used when judging approval or rejection of service supply, authentication password via mobile communication, usable amount showing the usable amount at the time of accounting, and the settlement record showing the record of accounting settlement.

Figure 30:
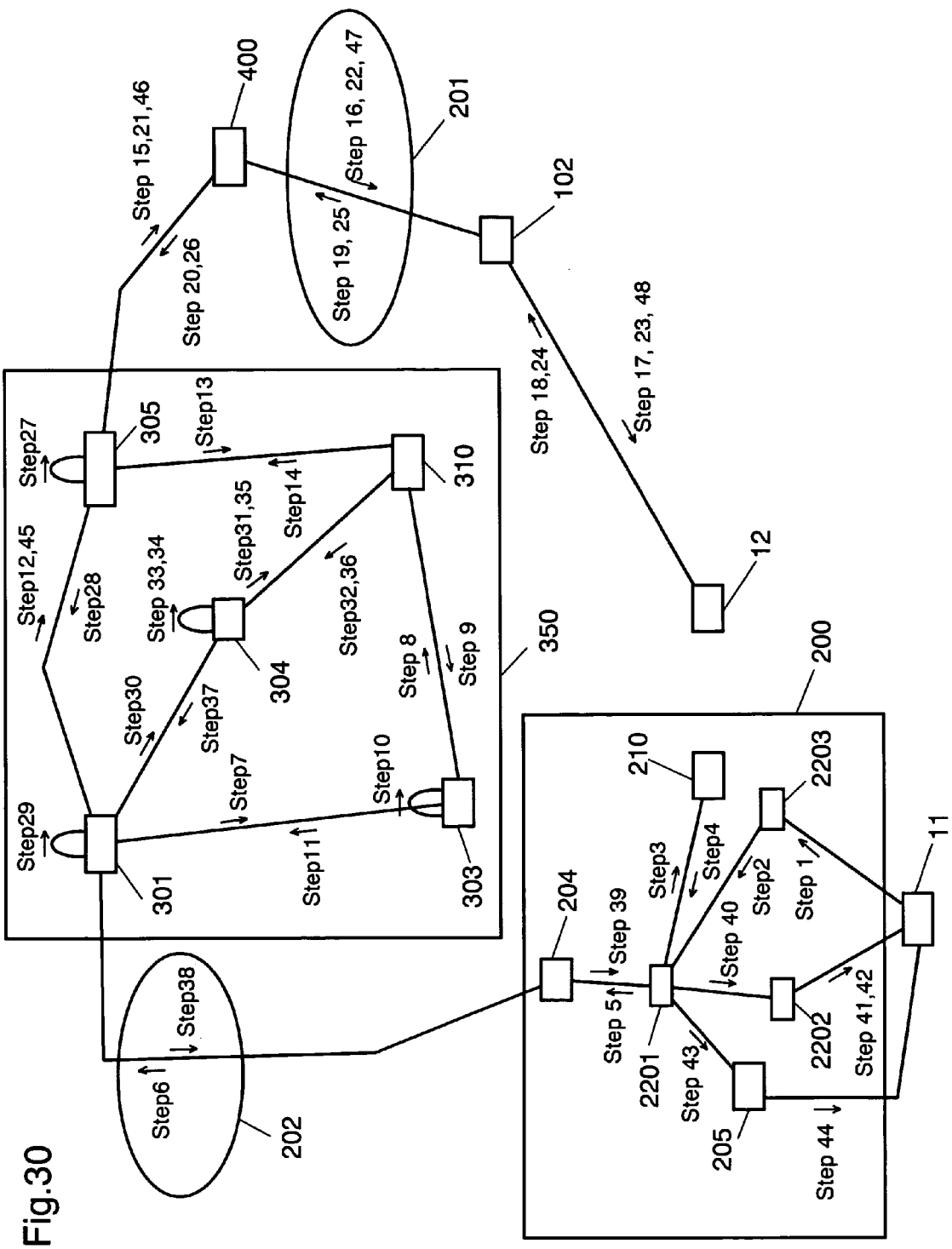
FIG. 30 is a collaboration diagram showing the accounting and authentication procedure when leaving of the accounting system applying the individual authentication system in the ninth embodiment of the invention.

FIG. 30 is a collaboration diagram showing the authentication and accounting procedure of the accounting system of the service facility 200 of automatic vending machine by applying the individual authentication system shown in the embodiment. Numerals in step 1 to step 48 show the sequence of processing procedure.

The operation of the accounting system in the service facility 200 such as automatic vending machine is explained below while referring to FIG. 30.

<Step 1>

The user 11 enters the request of cash-less purchase of, for example, tea by selection service in the input section 2203 provided in the service facility 200, and together with the member ID, basic authentication password, and address on the open information communication line 202 of the accounting device (hereinafter called accounting device address) at the same time.

Herein, the member ID and basic authentication password are those noticed from the accounting service provider when the debtor 12 has signed the accounting service presentation contract with the accounting service provider operating the accounting device 350. The noticed member ID and basic authentication password are stored in the DB 310 in the accounting device 350 owned by the accounting service provider, in correspondence to the name of the debtor 12 or user 11, and the mobile terminal call number of the terminal 102 owned by the debtor 12.

Incidentally, if the user 11 does not request cash-less purchase, the service can be offered by ordinary coins, bills or credit card.

<Step 2>

The input section 2203 reports the cash-less purchase request from the user 11 to the controller 2201 together with the selection service, member ID, basic authentication password, and accounting device address.

<Step 3>

The controller 2201, detecting the cash-less purchase request from the user 11, requests the accounting amount corresponding to the selection service of purchase of tea entered by the user 11, to the DB 210.

<Step 4>

The DB 210 executes search of commodity information by the key word of the requested selection service. When the same selection service is found, the accounting amount corresponding to this selection service is sent to the controller 2201.

<Step 5>

The controller 2201, when receiving the accounting amount, informs the communication means 204 of the member ID, basic authentication password, selection service, accounting amount, and accounting device address entered by the user 11, and issues an instruction of accounting request transmission to the accounting device 350.

<Step 6>

The communication means 204, when receiving the accounting request transmission instruction from the controller 2201, sends, by using the communication line 202, the member ID, basic authentication password, selection service, accounting amount, address of the service facility 200 on the communication line 202 (hereinafter called service facility address), facility name of service facility 200, and bank account number of the service facility 200, to the accounting authentication control means 301 in the accounting device 350. It also requests execution of individual authentication of the user 11, and accounting settlement (bank account transfer) service.

Herein, when transmitting the member ID, basic authentication password, selection service, accounting amount, address of the service facility 200, facility name of service facility 200, and bank account number of the service facility 200, by using the communication line 202, the communication security may be assured by encrypting the information.

<Step 7>

The control means 301, receiving the execution request of individual authentication and accounting settlement, sends the member ID and basic authentication password to the basic authentication means 303, and requests individual authentication of the user 11 corresponding to the member ID.

<Step 8> to <Step 10>

The basic authentication procedure of the authentication means 303 is same as in the procedure of step 18 to step 20 in the sixth embodiment.

<Step 11>

The authentication means 303 notices the member ID and the judging result of basic authentication to the control means 301.

<Step 12>

The control means 301, when the authentication result sent from the authentication means 303 is establishment of basic authentication, sends the member ID and facility name to the authentication means 305, and requests authentication via mobile communication.

Herein, if the result of basic authentication sent from the authentication means 303 is failure in establishment of basic authentication, the control means 301 stops the individual authentication, and skips to step 29.

<Step 13> to <Step 27>

The authentication procedure via mobile communication of the authentication means 305 is same as in the procedure of step 23 to step 37 in the sixth embodiment.

<Step 28>

The authentication means 305 notices the authentication result of authentication via mobile communication, together with the member ID, to the control means 301.

<Step 29>

The control means 301, if the authentication result sent from the authentication means 305 is successful, judges that the individual authentication of the user 11 is successful and that the accounting of the debtor 12 is approved.

If the authentication result is not successful, the accounting authentication control means 301 stops the accounting process, and goes to step 38.

<Step 30>

The authentication means 301 receiving the accounting permission from the debtor 12 sends the facility name of service facility 200, accounting amount, member ID, selection service, and bank account number of the service facility 200 to the accounting means 304, and request the accounting settlement process.

<Step 31>

The accounting means 304 requests the member usable amount corresponding to the member ID received from the control means 301, to the DB 310.

Herein, the member usable amount is the amount of money that can be used by the member corresponding to the member ID stored in the DB 310.

<Step 32>

The DB 310 executes search of the member user information by the key word of the requested member ID. When the same member ID is found, the member usable amount corresponding to this member ID is sent to the accounting means 304.

<Step 33, Step 34>

The accounting means 304, when the member usable amount is returned from the DB 310, compares the transmitted accounting amount and the member usable amount. For example, when the member usable amount is larger than or same as the accounting amount, or when the member usable amount is lager than or same as the sum of the accounting amount and the accounting commission, it is judged that the bank transfer to the service facility 200 is possible. The accounting amount is remitted to the bank account number of the service facility 200 sent from the user 11, and the process goes to step 34.

If, however, the member usable amount is smaller than the accounting amount, or if the member usable amount is smaller than the sum of the accounting amount and the accounting commission, it is judged that the accounting is not possible, and stops the accounting process and goes to step 37.

<Step 35>

The accounting means 304 requests the DB 310 to rewrite the member usable amount after accounting process and overwrite the settlement record about the item of member usable amount and item of settlement record corresponding to the member ID received from the accounting authentication control means 301. Herein, the member usable amount after accounting process is the balance of subtracting the accounting amount from the member usable amount, or the balance of subtracting the accounting amount and commission from the member usable amount.

<Step 36>

The DB 310 executes search of member user information in the database by the keyword of the requested member ID. When the same member ID is found, it executes to rewrite the member usable amount after accounting process and overwrite the accounting record about the item of member usable amount and item of accounting record corresponding to this member ID, and the termination of rewriting and overwriting is sent to the accounting processing means 304.

The accounting of the debtor 12 is settled according to the accounting record recorded in the DB 310 by the accounting device 350, from the bank account designated by the debtor 12 when signing the accounting service presentation contract with the accounting service provider operating the accounting device 350.

The timing of this settlement may be either every specific period or in real time. If the accounting device 350 itself operated by the accounting service provider has the settling function, the DB 310 may be designated as the settling account, and the member usable amount for the member ID may be the balance of the settling account. In this case, the accounting process at step 35 and step 36 functions as the settling process to the debtor 12.

<Step 37>

The accounting means 304, when receiving the writing end notice from the DB 310, judges that the accounting process is normally terminated and reports the result to the control means 301. When accounting is impossible at the step 33, the accounting means 304, the abnormal end of accounting process is reported to the control means 301.

Herein, receiving the judging result of accounting process, the control means 301 executes step 38 to step 44, and step 45 to step 48 in parallel operation.

<Step 38> to <Step 44>

The operating procedure of the service facility 200 after accounting settlement process is same as in the procedure of step 48 to step 54 in the sixth embodiment.

<Step 45> to <Step 48>

The operating procedure of the mobile communication authentication means 305 after accounting settlement process is same as in the procedure of step 55 to step 58 in the sixth embodiment.

The embodiment relates to the accounting system and service of automatic vending machine such as juice vending machine and ticket vending machine by applying the accounting device 350 shown in FIG. 28, but when the accounting device 350 of the embodiment is combined with the accounting service of the fixed fee facility shown in the seventh embodiment, or the hourly fee facility or parking lot shown in the eighth embodiment, it is possible to build up an accounting system of cash-less service to the service facility 200 without requiring prior registration between the service facility 200 and accounting device 350.

What is claimed is:

1. An authentication method, comprising:
   (a) receiving a first identifier of a user and a password from the user at a point of service (POS) terminal;
   (b) obtaining a first password corresponding to said first identifier;
   (c) identifying said user by comparing the first password and said password received from the user;
   (d) thereafter, obtaining a second password and a second identifier corresponding to said first identifier, said second identifier comprising a mobile terminal call number of a communication terminal;
   (e) thereafter, establishing a communication link between a signal source and the communication terminal using the second identifier for the purpose of third party authentication of said user;
   (f) receiving another password from the communication terminal; and
   (g) establishing authentication of said user when said another password matches said second password, wherein:
   step (b) includes correlating the first identifier with corresponding information stored in a database to obtain said first password from the corresponding information.

2. An authentication apparatus, comprising:
   a receiving section that receives a first identifier and a password provided to a point of service (POS) terminal by a user;
   an identification determining section that obtains a first password corresponding to said first identifier;
   a section that identifies said user by comparing the first password and said password received from the user;
   a section that obtains a second password and a second identifier corresponding to said first identifier, said second identifier comprising a mobile terminal call number of a communication terminal;
   a signal source;
   a link establishment section that establishes, for the purpose of third party authentication of said user, a communication link between the signal source and the communication terminal using the second identifier;
   a section that receives another password from the communication terminal; and
   an authorization section that authenticates the user when said another password matches said second password, wherein:
   the identification determining section associates the first identifier with stored corresponding information and obtains the first password from the stored corresponding information.

* * * * *